US005764773A

United States Patent [19]
Nishiura

[11] Patent Number: 5,764,773
[45] Date of Patent: Jun. 9, 1998

[54] REPEATING DEVICE, DECODER DEVICE AND CONCEALMENT BROADCASTING

[75] Inventor: Masaaki Nishiura, Saitama-ken, Japan

[73] Assignee: Kabushiki Kaisha Toshiba, Kawasaki, Japan

[21] Appl. No.: 481,273

[22] PCT Filed: Nov. 2, 1994

[86] PCT No.: PCT/JP94/01852

§ 371 Date: Sep. 27, 1995

§ 102(e) Date: Sep. 27, 1995

[87] PCT Pub. No.: WO95/12951

PCT Pub. Date: May 11, 1995

[30] Foreign Application Priority Data

Nov. 5, 1993 [JP] Japan ..................... 5-277156

[51] Int. Cl.$^6$ ............................. H04L 9/00; H04N 7/167
[52] U.S. Cl. .................. 380/49; 380/9; 380/10; 380/50
[58] Field of Search .................. 380/6, 7, 9, 10, 380/20, 49, 50

[56] References Cited

U.S. PATENT DOCUMENTS

| | | | |
|---|---|---|---|
| 4,995,080 | 2/1991 | Bestler et al. | 380/20 X |
| 5,018,197 | 5/1991 | Jones et al. | 380/20 |
| 5,161,192 | 11/1992 | Carter et al. | 380/49 X |
| 5,353,353 | 10/1994 | Vijeh et al. | 380/49 X |
| 5,386,470 | 1/1995 | Carter et al. | 380/49 X |

FOREIGN PATENT DOCUMENTS 5-284496  3/1992  Japan ............. H04N 7/167

OTHER PUBLICATIONS

Electric Communication Technology Deliberative Council Report.
Ministerial ordinance No. 77 and a notification No.803 of Japan Ministry of Posts and Telecommunications relating to televison character multiple broadcasting.

Primary Examiner—Bernarr E. Gregory
Attorney, Agent, or Firm—Cushman Darby & Cushman IP Group of Pillsbury Madison & Sutro LLP

[57] ABSTRACT

In a head end (3), which sends a satellite broadcasting signal received through a BS antenna to a connected cable, scrambled video and audio signals are separated by a separation part (11) from a satellite broadcasting signal. An information signal for descrambling and relevant information packets, which are multiplexed upon the audio signal, are further separated from each other by a separation part (13). The information signal for descrambling is packeted by a packeting part (45). Thereafter, the information signal is decoded, and an error correction code corresponding to the information signal is read out from a ROM and is added thereto. Subsequently, the packeted information packets for conducting the descramble and the relevant information packets separated from each other by the separation part (13) are multiplexed upon a vertical blanking period of time in the video signal by a VBI multiplexing part (51). The information packets are also multiplexed upon the relevant information packets, the information packets being positioned in preference to the relevant information packets within the multiplexed output. The scramble video signal from the VBI multiplexing part (51) and an audio signal, in which a scramble video signal of the satellite broadcasting signal is descrambled by a descrambler (39), are multiplexed in frequency by a frequency multiplexing part (53), and are sent out to a cable.

7 Claims, 13 Drawing Sheets

CR (BIT SYNCHRONIZATION CODE)   1010101010101010
FC (BYTE SYNCHRONIZATION CODE) 11100101

TS --- 91BITS   YES : 1, NO : 0
VS --- 91BITS   ON : 1, OFF : 0

| PRIORITY ORDER | PACKET NAME | Y0 | Y1 |
|---|---|---|---|
| 1 | TS,VS PACKETS (SCRAMBLE TIMING TS PACKET) | 0 | 0 |
| 2 | COMMON INFORMATION PACKET | 0 | 1 |
| 3 | INDIVIDUAL INFORMATION PACKET | 1 | 0 |
| 4 | MESSAGE INFORMATION PACKET | 1 | 1 |

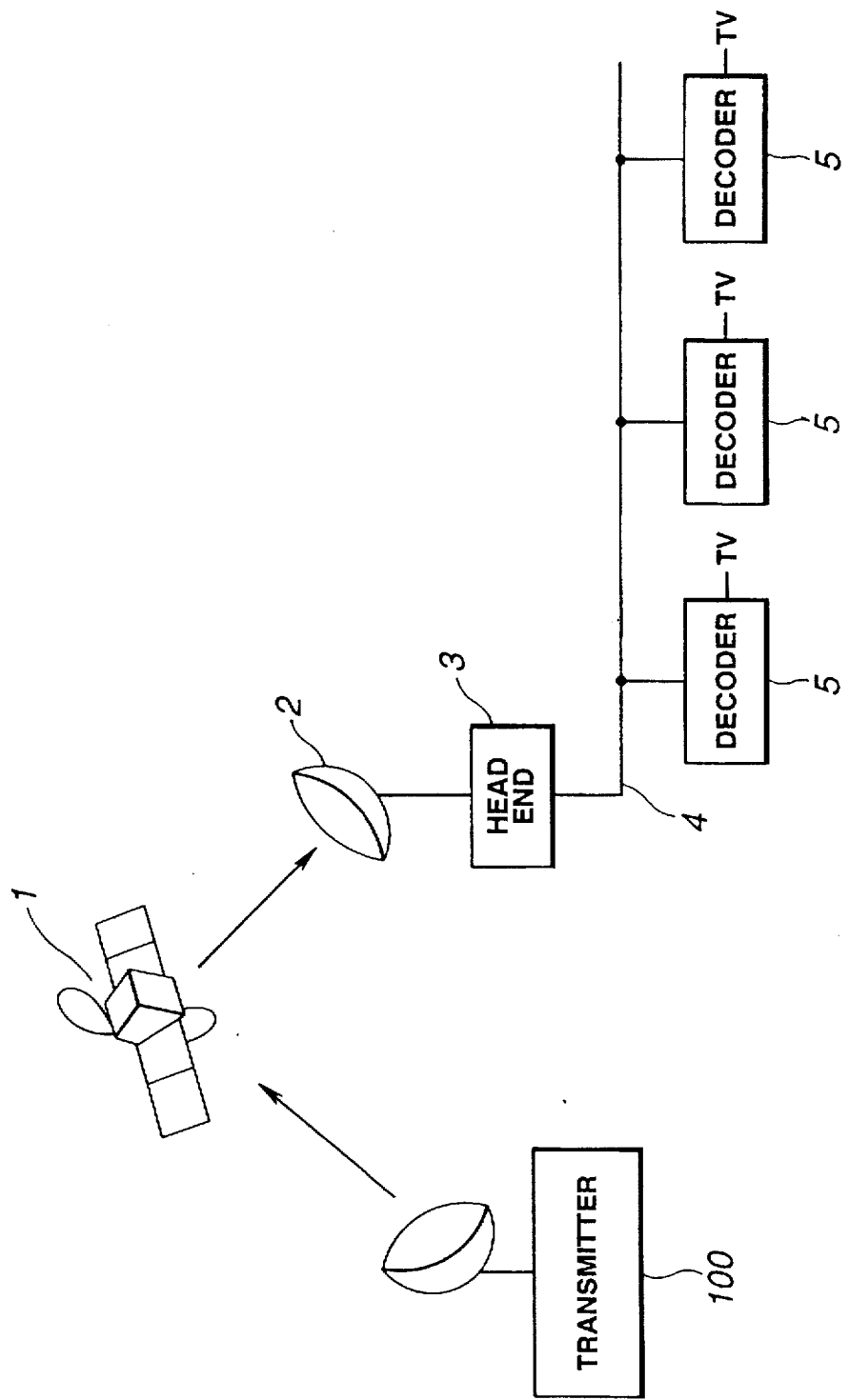

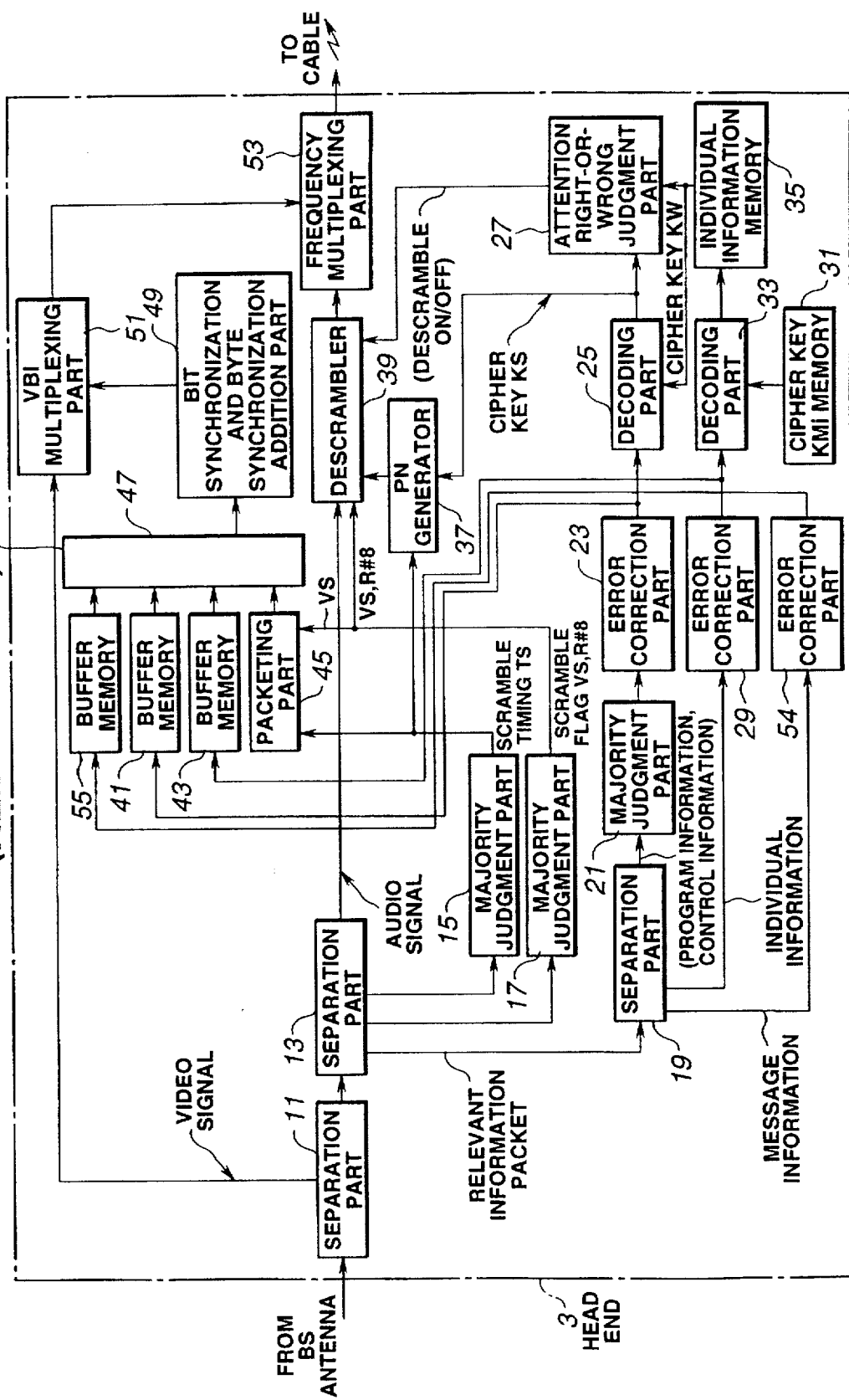

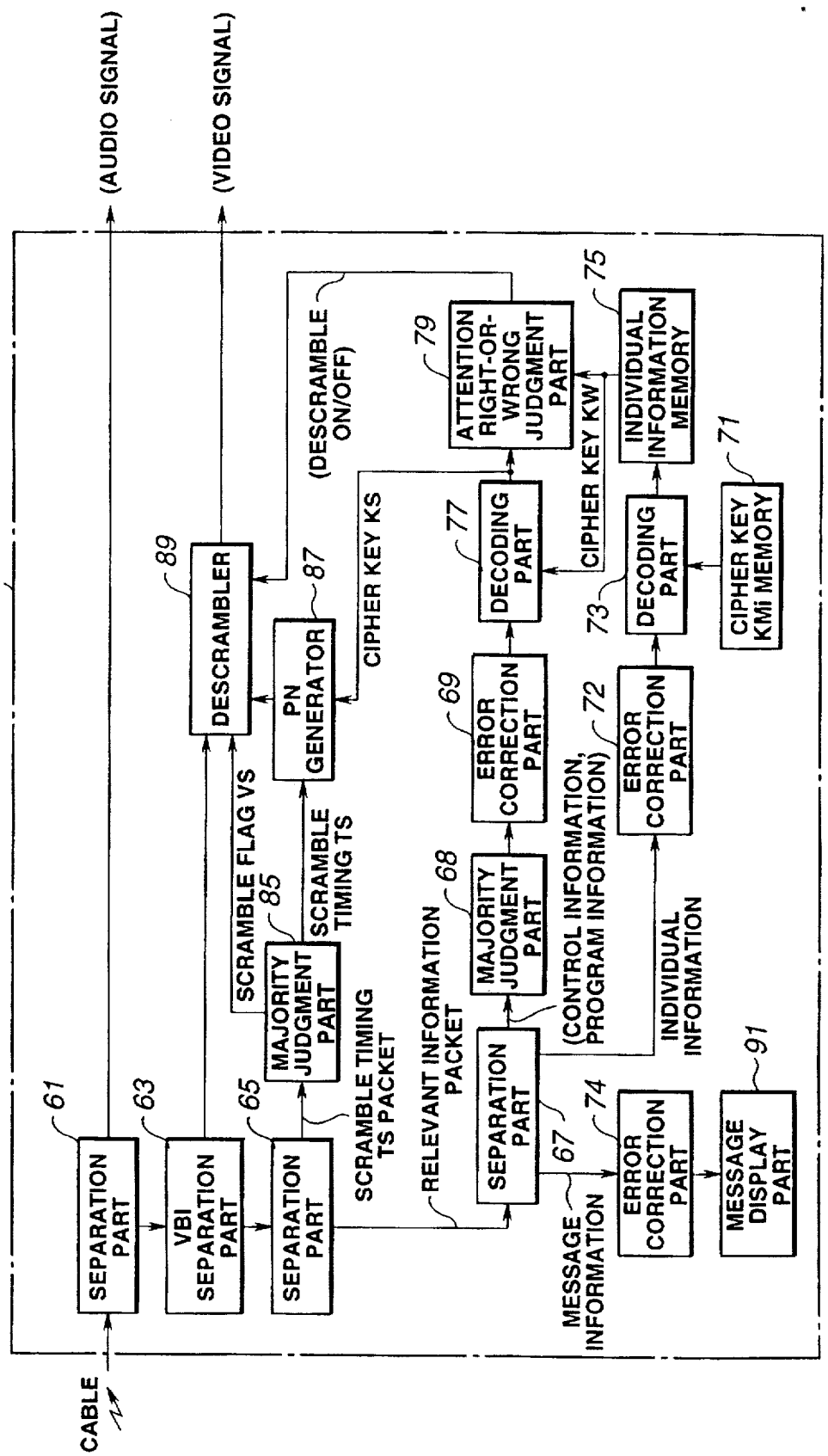

REPEATING DEVICE, DECODER DEVICE AND CONCEALMENT BROADCASTING

TECHNICAL FIELD

This invention relates to repeating devices, decoder devices and encryption and broadcasting apparatuses and, particularly, to repeating devices, decoder devices and encryption and broadcasting apparatus used in a CATV (Community Antenna TV, Cable TV) or the like which individually receive encrypted broadcasting from an antenna and/or a cable.

BACKGROUND TECHNOLOGY

In recent years, encrypted broadcasting(broadcasting available only for specific viewers) has become more prevalent, and a receiving device for receiving encrypted broadcasting has become more common. Encrypted broadcasting, which uses an encryption and broadcasting apparatus, is arranged such that a broadcasting station encrypts video and audio signals (a process hereinafter referred to as "scrambling") before the signals are transmitted so that persons outside the intended audience who receive the encrypted signals are unable to understand/decipher them. In contrast, the intended audience is provided with decoder devices (hereinafter referred to as "decoders") having a descrambler to decode (a process hereinafter referred to as "descrambling") the scrambled signal, to reproduce the original audio and video signals. Moreover, the arrangement is such that only persons outside the intended audience are prohibited from descrambling the scrambled signal, rendering those persons incapable of receiving the information carried in the scrambled signal.

An example of an encrypting and broadcasting system will be described as an example of a COATEC (COATEC: Conditional Access Technology Research Institute) system, one of the chargeable satellite broadcasting systems which is presently employed or operated in Japan. FIG. 12 shows an arrangement of a transmitter 100 of the broadcasting station on the transmission side in accordance with the COATEC system.

The transmitter 100 uses scramblers 101 and 105 to scramble the video and audio signals. A scramble flag is read by the receiving side to determine whether the scrambled signals have undergone scramble broadcasting on the receiving side. The scramble flag corresponds to the eight bit (hereinafter referred to as "R#8") of a range bit which is multiplexed upon the audio signal and the twelfth bit of the control code (a video scramble flag, hereinafter referred to as "VS") in case the COATEC system.

The scramble flag (hereinafter referred to as "successive sending") is continuously sent (hereinafter referred to as "successive sending") a plurality of times by a successive-sending control part 111 of transmitter 100. The scramble flag is therefore multiplexed upon the scramble audio signal by the multiplexing part 123 before being transmitted. Accordingly, the scramble flag is judged based on parity by a majority judgment part of the decoder on the receiving side to avoid errors. The scramble flag is received by scramblers 101 and 105 of transmitter 100, ON/OFF control of the scrambled video and audio signals is conducted.

A PN signal(otherwise known as a pseudorandom noise) signal or a pseudorandom signal) is sent from the transmitter 100 to the decoder, and is used to scramble and descramble signals. The transmitter 100 and the decoder have respective PN generators for generating the same PN signal. To acquire an identical PN signal in the transmitter 100 and the decoder, the PN initial value (cipher key) KS in the PN generator is set with the same timing used for the video and audio signals.

A scramble timing signal T5 is used to set the PN initial value KS. A majority judgment part of the decoder is able to judge, in majority, the scramble timing TS, and to conduct the protection against the errors. To permit this majority judgment, the transmitter 100 includes successive-sending control part 109 for successively sending the scramble timing TS, and multiplexing part 123 for multiplexing the scramble timing TS upon the scramble audio signal. Transmitter 100 then outputs the multiplexed product. Further, the transmitter 100 inputs the scramble timing TS into PN generators 103 and 107, where the scramble timing TS is used to set the PN initial value KS with the same timing.

The above-described encrypting and broadcasting system of the COATEC system uses encryption keys of three kinds (called also "keys", shown below) to prevent decoding by persons outside the intended audience. The encryption keys and relevant information packets will subsequently be described. Note that the relevant information types:

The details of the program information, the individual information, the control information and the message information have been described in Electric Communication Technology Deliberative Council Report (refer to page 48 to page 57) regarding encrypting and satellite broadcasting in Japan. These will be described briefly as follows.

The program information is transmitted having a predetermined cycle or period (one second, for example). The program information includes the information and the program number which are required for descrambling, such as the encryption keys KS or the like. If the program information is omitted on the decoder side, it is impossible to descramble the encrypted broadcast for a constant or predetermined period of time. The control information is used to temporarily disable reproduction of the encrypted broadcast in case of late payments or the like, and to again enable reproduction of the encrypted broadcast after payment is made. The control information can be used to enable/disable a specific decoder forcibly. The individual information is transmitted carrying encryption keys KW or the like. The individual information includes contract service, contract registration codes, an effective period or the like. The individual information is transmitted only to the decoders of persons within the intended audience. The message information transmits information such as a name of a program or the like.

The encryption keys will subsequently be described.

First, the PN initial value KS, which is a encryption key, is an initial value which is given to the PN generators 103 and 107 and which is used to scramble the video and audio signals in the scramblers 101 and 105. The PN initial value KS is also given to the PN generator which is used to descramble the video and audio signals in the decoder. In this connection, the PN generator is a pseudorandom data generator; it is used to randomly scramble the video and audio signals to increase security.

The intended use for the PN initial value is to update or renew the PN initial value KS during an extremely short period of time (e.g., every one second) to raise the security. The following description will be made assuming an update period of one second. The PN initial value KS is transmitted to the decoder as a part of the program information. At this time, incidentally, the program information and the control information are enciphered using the encryption keys KW at an encipherment part 113 on the transmission side 100.

Thereafter, the multiplexed output is superimposed upon the transmission signal a plurality of times so that the program information and the control information are successively sent by a successive-sending control part 115. The decoder side compares successively-sent information within the multiplexed output with other of the successively-sent information within the multiplexed output. The decoder side then conducts majority-judgment processing to determine and extract the correct information based on the frequency level (height) in which similar successively-sent information in the multiplexed output are received.

The encryption keys KW, which are transmitted together with the individual information, will subsequently be described. The renewal period of the encryption keys KW is once a month, for example. Repeated transmission is made of a broadcasting wave from a broadcasting station to a decoder of an intended audience member who renews their membership over successive months. The broadcasting wave is not transmitted from a broadcasting station to decoders of persons outside the intended audience or to decoders of persons who are in arrears.

Encryption codes corresponding to the received encryption keys KW are decoded by a decoder. The encryption codes are then stored in an individual information memory. The encryption codes are read out from the individual information memory, at any time, and are used to decode the program information which includes the PN initial value KS sent every one second. Further, the encryption keys KW are transmitted to each of the decoders from the broadcasting station 100 each time the encryption keys KW are renewed as a part of the individual information. In this connection, the individual information including the encryption keys KW is encrypted by encipherment part 117 and is then superimposed upon and transmitted with a transmission signal. The encryption keys KW are not successively sent.

Encryption keys KMi will subsequently be described. The encryption keys KMi are used to encript the encryption keys KW in order to improve the security of the encryption keys KW. The encryption keys KMi are used to secure encryption keys KW when the broadcasting station 100 transmits the individual information including the encryption keys KW to the decoders of only those persons within the intended audience and to the decoders of persons in the intended audience who renew their subscription on a monthly basis.

The encryption keys KMi are ones which are written to an encryption key KMi memory of decoders upon factory delivery of the decoders, for example. They are decoder specific, differing from decoder to decoder. Accordingly, the encryption keys KMi are transmitted separately for each of the decoders, whereby it is possible to separately transmit the encryption keys KW to every decoder. That is, it is impossible to decode the encryption keys KW for decoders having different transmitted encryption keys KMi.

The aforesaid program information and control information are multiplexed upon (superimposed upon) the individual information and the message information at a multiplexing part 119. Error correction codes are added to the multiplexed output at an error-correction-code addition part 121. Thereafter, the program information and control information are multiplexed, in time sharing, upon a scramble audio signal by the multiplexing part 123 together with the scramble flag VS, the scramble flag R#8 and the scramble timing TS. Furthermore, the program information and control information are multiplexed upon a scramble video signal by a multiplexing part 125, and the output is transmitted.

A common receiving system has been proposed in which waves transmitted from the transmitter 100 of a satellite broadcasting system, such as the COATEC system shown in FIG. 12 pass through a broadcasting satellite (hereinafter referred to as "BS"). Those waves are then supplied to a repeating device (hereinafter referred to as "head end") such as CATV (Community Antenna TV, Cable TV) through an antenna. The waves are ultimately distributed from a head end of the repeating device to a decoder of each of the audience or attention contractors through a cable. With regard to the system, a patent application has been filed which is made directed toward a "Chargeable Broadcasting Apparatus". The patent application was filed by the present applicant to Japanese Patent Office on Mar. 31, 1992 (Specification of Japanese Patent Application No. 77936/1992).

FIG. 13 shows a satellite broadcasting system relating to the above-described patent application. A BS broadcasting wave which has been transmitted from the transmitter (broadcasting station) 100 passes through a BS 1, is received by a BS antenna 2 for common receiving, and is sent to a head end 3. The head end 3 conducts, in FM, detection of the BS broadcasting wave by a BS tuner. Moreover, the head end 3 conducts separation of a scrambled video signal and a bit stream from each other. Furthermore, the head end 3 separates, from the bit stream, the scrambled audio signal, an information signal used for descrambling (the scrambling timing TS and the scrambling flags VS and R#8) and relevant information packets (the program information, the control information, the individual information and the message information). Thereafter, the information signal, which is used for descrambling, is packeted. Multiple packets of information signals are multiplexed, in time sharing, upon the relevant information packets. Thereafter, the multiplexed packets are multiplexed upon (superimposed upon) a plurality of specific lines during a vertical blanking period (hereinafter referred to as "VBI") of the scrambled video signal. Moreover, the VBI-multiplexed scrambled video signal and the signal in which the scrambled audio signal is descrambled are respectively re-modulated (RF-modulation), are multiplexed in frequency, and are sent out to a cable 4.

Decoding devices 5 (hereinafter referred to as "VBI corresponding decoders"), which correspond to the plurality of VBI multiplexing devices for the respective users, are connected to the cable 4. Each of the VBI corresponding decoders 5 conducts AM detection using a VHF•UHF tuner, and conducts separation of the scrambled video signal and the audio signal from each other. Further, the VBI corresponding decoders 5 separate the packets which are superimposed upon the VBI of the scrambled video signal. Thereafter, the scrambled video signal is descrambled based on information packets. In this connection, the audio signal is further demodulated in audio. The demodulated video signal and audio signal are inputted to a television (TV) (not shown).

In FIG. 13, it is assumed that an atmospheric system that conducts signal transmission by the waves from the transmitter to the head end through the satellite is a first signal transmission system, and a cable system that conducts signal transmission from the head end to the decoder (on the side of a terminal) is a second transmission system.

FIG. 14 is a block diagram showing an arrangement of the head end 3 of the broadcasting system shown in FIG. 13, while FIG. 15 is a block diagram showing an arrangement of the VBI corresponding decoder 5.

The head end shown in FIG. 14 separates the scramble video and audio signals by a separation part 11. Thereafter, separation part 13 separates the scramble flag VS, the scramble flag R#8, the scramble timing TS and the relevant information packets in which the relevant information is packeted, which are multiplexed upon the scramble audio signal. The majority judgment is conducted as previously described. Thereafter, the separated scramble timing TS is inputted to a packeting part 45 and a PN generator 37 through a majority judgment part 15. The scramble flag VS and the scramble flag R#8 conduct, respectively, the majority judgment at a majority judgment part 17. Thereafter, both the scramble flag VS and the scramble flag R#8 are inputted to the packeting part 45. In this connection, the scramble flag R#8 is not transmitted to the packeting part 45. At the packeting part 45, the scramble timing TS and the scramble flag VS are packeted.

Further, the relevant information packets are separated from each other by a separation part 19 in accordance with sort identification codes in the data as: common information (program information and control information), the individual information and the message information in accordance with sort identification codes in the data. Of them, the common information (the program information and the control information) undergoes majority judgment at a majority judgment part 21. Moreover, error correction is conducted at an error correction part 23. Thereafter, the common information (the program information and the control information) is inputted to a decoding part 25. Furthermore, with regard to the individual information, error correction is conducted at an error correction part 29. Thereafter, the individual information is inputted to a decoding part 33. The message information conducts error correction at an error correction part 54 and is subsequently inputted to a buffer memory 55.

In the common information (the program information and the control information), the encryption keys KW, which are stored in an individual information memory 35, are used to decode the encryption keys KS or the like at the decoding part 25. Furthermore, the PN initial value KS from the decoding part 25 is inputted to the PN generator 37. The other data are given to an attention right-or-wrong judgment part 27. In this connection, in the individual information, the encryption keys KMi are used in the decoding part 33 so that the encryption keys KW or the like are decoded. Thereafter, the individual information is stored in the individual information memory 35.

Further, the scramble audio signal which is separated by the separation part 13 is descrambled by the descrambler 39 in accordance with the scramble flag R#8, the scrambling timing TS and the PN signal, and is inputted to a frequency multiplexing part 53.

The relevant information packets which are outputted from the error correction parts 23, 29 and 54 are stored in three buffer memories including buffer memories 41, 43 and 55. Accordingly, the data is temporarily held and the data rate of the buffer-stored packets is converted, and the converted output is to be multiplexed upon the VBI. The common information (the program information and the control information) packets are stored in the buffer memory 41 and, thereafter, the same data are read out a plurality of times for successive sending.

The common information (the program information and the control information) packets, the individual information packets, the message information packets, and the packets in which the scramble timing TS and the scramble flag VS are packeted in the packeting part 45 (hereinafter this packet will be called a scramble timing TS packet) and multiplexed in time sharing by a time-sharing multiplexing part 47. Bit synchronization and byte synchronization, similar to character multiple broadcasting, are added by a bit synchronization and byte synchronization addition part 49.

Moreover, similar to the character multiple broadcasting, the signal is VBI-multiplexed upon a VBI of the video signal which is not descrambled (that is, the scramble video signal) by a VBI multiplexer of VBI multiplexing part 51.

Here, the transmitting packets will be described. According to a ministerial ordinance No. 77 and a notification No. 803 of Japan Ministry of Posts and Telecommunications relating to television multiple character broadcasting, the number of bits of data capable of being transmitted by a single line is 272 bits, including a prefix. If the bit synchronization and the byte synchronization are also added thereto, the number of bits is 296 bits. The relevant information packets in the chargeable satellite broadcasting (BS) are such that the number of bits except of the header is just 272 bits. If the arrangement of is a packet arrangement of the character multiple broadcasting, it is possible to transmit only the packets during a single line period.

Further, in the satellite broadcasting system, first eight bits of the data of 272 bits are sort identification. They are used for identification of the program information, the control information, the individual information and the message information. Also, in the multiple character broadcasting, assuming that the first eight bits of 272 data bits are the sort identification, data which changes every packet are identified for detection on the receiving side. In this respect, the satellite broadcasting and the multiple character broadcasting can be similarly treated.

Accordingly, in order to VBI-multiplex the relevant information packets of a satellite system and to transmit the same, the bit synchronization and the byte synchronization are added to the 272 bits except for the header from the relevant information packets. Thereafter, the VBI multiple becomes a part of the video signal, rendering it possible to use a signal processing IC for the character multiple broadcasting on the receiving side bringing down the cost.

The number of lines required for VBI-multiplexing and transmitting the relevant information packets will subsequently be described. In the chargeable satellite broadcasting system, the period (transmitting interval) of the relevant information packets is 9 ms. Accordingly, the transmitting capacity (transmitting speed or velocity) of the packets is about 111 packet/s. Moreover, transmission of the scramble timing TS packets is at most few packets per second (it is assumed that the period of the scramble timing TS=1 s), even if successive sending is employed. If during packet transmission of the VBI multiple, as conducted in the character multiple broadcasting, two lines are used in the packet transmission each field (that is, one filed is ⅟60 s, and if two packets are transmitted each field), the period (transmission interval) of the packets is 8.35 ms and the transmission capacity of the packets is about 120 packet/s. Moreover, the packet transmission capacity in the character multiple broadcasting is larger or higher than the transmission capacity of the scramble timing TS packets and relevant information packets in the chargeable satellite broadcasting (COATEC system). Therefore, it is possible to sufficiently transmit the scramble timing TS packets and the relevant information packets, to the VBI of the video signal.

Description of the VBI corresponding decoder 5, shown in FIG. 15, will subsequently be made. In the VBI corresponding decoder 5, the audio signal and the video signal, which are multiplexed in frequency upon each other, are separated from each other in a separate part 61. The packets, which are multiplexed upon the VBI of the video signal, are separated from each other by a VBI separation part 63. It is possible to utilize, as the VBI separation part 63, a signal processing IC (a waveform equivalent IC, a synchronization separation IC, a multiple character extracting IC or the like) which has been developed for receiving the character multiple broadcasting. The packets, which are separated from each other by the VBI separation part 63, are separated from each other by the VBI separation part 63 are separated into the relevant information packets and the scramble timing TS packets in accordance with the kinds thereof, at a separation part 65.

After being separated from each other in the separation part 65, the scramble timing TS packets are judged in majority in a majority judgment part 85 so that the scramble timing TS and the scramble flag VS are extracted. The scramble timing TS and the scramble flag VS are inputted respectively to a PN generator 87 and a descrambler 89.

Additionally, after being separated from each other in separation part 65, the relevant information packets are separated by a separation part 67 into the packets including the common information (the program information and the control information), the individual information and the message information, depending upon the sort identification. Of them, the common information (the program information and the control information) packets are judged, in majority, in a majority judgment part 68. After being judged by majority judgment part 68, the packets are passed through an error correction part 69 and are inputted to a decoding part 77. The individual information packets pass through an error correction part 72 and, thereafter, are inputted to a decoding part 73. Since the message information packets are not enciphered, the message information packets pass through an error collection part 74 and, thereafter, are displayed at a message display part 91 without decoding.

The common information (the program information and the control information) packets are arranged such that the information including the encryption key KS is decoded by the decoding part 77 using the encryption keys KW. The obtained or acquired PN initial value KS is inputted to the PN generator 87. The other data are given to an attention right-and-wrong judgment part 79. In this connection, the individual information packets are such that the encryption keys KW or the like are decoded in the decoding part 73 based on the encryption keys KMi from the encryption key KMi memory. Thereafter, the individual information packets are stored in an individual information memory 75.

The attention right-or-wrong judgment part 79 compares the program information to the data within the individual information memory 75, to conduct attention right-or-wrong judgment. According to the judgment, the descrambler 89 conducts an ON/OFF of descramble operation. Specifically, the arrangement is such that the decoder cannot descramble encrypted broadcasting signals when the contents of the individual information are not suited with the program information, rendering negative the results of the attention right-or-wrong judgment are "no".

SUMMARY OF THE INVENTION

The satellite broadcasting apparatus of the COATEC system described above has the following problem in the head end and the VBI decoder corresponding thereto:

(1) In the head end, when the scramble timing TS packets and the relevant information packets are merely multiplexed upon the VBI of the video signal so as to be cable-transmitted and the multiplexed output is decoded by the decoder, the descrambling cannot necessarily be conducted if the scramble timing TS packets of the packets are not preferentially treated.

(2) Additionally, since the packet transmission speed of the multiple character broadcasting is higher than the transmission speed of the relevant information packets of the satellite broadcasting, a free area is generated in the VBI multiplexing part of the video signal if the scramble timing TS packets and the relevant information packets are multiplexed upon the VBI of the video signal. Thus, a descrambling process cannot be continuous.

(3) Furthermore, when the scramble timing TS and the scramble flag VS are packeted in the packeting part of the head end, the error correction codes (redundant bits) must be added thereto. However, in order to compute (that is, to calculate using a generating polynomial or the like) the redundant bits in accordance with the contents of the TS and the VS, time is taken and the arrangement of the packeting part is complicated.

In view of the above, an object of the invention is to provide a repeating device, a decoder device and a concealment broadcasting apparatus capable of maintaining the reliability and the continuity of descramble processing which are easy in error correction coding and which are high in error correction probability of data.

A first invention is directed to a repeating device for sending a concealment broadcasting signal received from a first transmission system, to a second transmission system, said repeating device comprising:

descramble means for descrambling an information signal and relevant information packets for descrambling said concealment broadcasting signal, by said concealment broadcasting signal, to separate and extract the same;

packeting means for packeting the descrambling information signal which is acquired by said descramble means; and preference multiple means for outputting the packets of the descrambling information signal packeted by said packeting means and relevant information packets separated from each other by the descramble means, to said second transmission system in multiple upon said concealment broadcasting signal, to multiplex packets of an descrambling information signal in preference to relevant information packets, upon the packet multiple.

According to the first invention, since the packets of the descrambling information signal are multiplexed upon the relevant information packets in preference thereto, the descrambling information signal is processed with a preference in a decoder device. Thus, there is not interference in descramble processing of the video signal. The descramble is therefore secured and conducted.

Further, a second invention is directed to a decoder device for decoding a received concealment broadcasting signal to output the same, comprising:

separation means for separating information packets and relevant information packets for descrambling said concealment broadcasting signal, which are multiplexed upon said concealment broadcasting signal; and descramble means for descrambling the concealment broadcasting signal on the basis of said descrambling information packets which are separated from each other by said separation means, said descramble means conducting descramble processing in the order of receiving timing of the packets and eliminating a time blank in the descramble processing.

According to the second invention, the descramble processing is continuously conducted reliably and without being interrupted, in the decoder device.

A concealment broadcasting apparatus according to a third invention is characterized by comprising a repeating device, and a decoder device which is connected to the repeating device through a predetermined transmission system, wherein upon packeting multiplexing by the multiple means of the repeating device, the descrambling information packets are multiplexed upon each other in preference to the relevant information packets, and, upon conduction of the descramble processing by the descramble means of the decoder device, the descramble processing is conducted in the order of receiving timing of the packets.

According to the third invention, the descrambling information packets are multiplexed upon each other in preference to the relevant information packets, while, in the decoder device, the descramble processing is conducted in the order of receiving timing of the packets. Accordingly, the descramble is reliably conducted without interference to the descramble processing.

A concealment broadcasting apparatus according to a fourth invention is characterized by comprising a repeating device for sending a concealment broadcasting signal which is transmitted through a first transmission system, to a second transmission system, and a decoder device for intervening said second transmission system between the repeating device and the decoder device to receive and decode said concealment broadcasting signal, wherein, when an information signal for conducting descramble is packeted by packeting means of the repeating device, packets of the descrambling information signal are multiplexed upon a free area of a multiple part of said concealment broadcasting signal, and are transmitted under a sate in which the free area is occupied by the packets, and, when descramble processing is conducted by descramble means of the decoder device, a time blank is eliminated in the descramble processing.

According to the fourth invention, the descramble processing in the decoder device is continuously conducted without being interrupted.

A concealment broadcasting apparatus according to a fifth invention is characterized by comprising a repeating device, and a decoder device which is connected to the repeating device through a cable, wherein, when an information signal for descrambling is packeted by packeting means of the repeating device, a plurality of error correction codes which corresponds to the signal contents of the information signal for descrambling are beforehand held or retained in memory means, wherein, when being packeted, the information signal for descrambling is decoded and the error correction codes corresponding thereto are read out from said memory means and are added thereto, and wherein, in the error correction in the decoder device, the error correction of the information signal for descrambling is conducted by said error correction codes, to raise error correction probability.

According to the fifth invention, since the error correction codes which are beforehand stored in the memory means are used, the error correction coding in the repeating device is easy and fast. In addition, it is possible to raise the error correction probability in the decoder device.

BRIEF DESCRIPTION OF THE DRAWINGS

FIG. 13 is a view describing a chargeable satellite broadcasting system of an application which has already been filed;

FIG. 14 is a block diagram shown a schematic arrangement of a head end of the chargeable broadcasting system shown in FIG. 13; and FIG. 15 is a block diagram showing a schematic arrangement of a VBI decoder of the chargeable broadcasting system shown in FIG. 13.

PREFERRED EMBODIMENT OF THE INVENTION

Embodiments of the invention will be described in detail with reference to the drawings.

Figure 1:
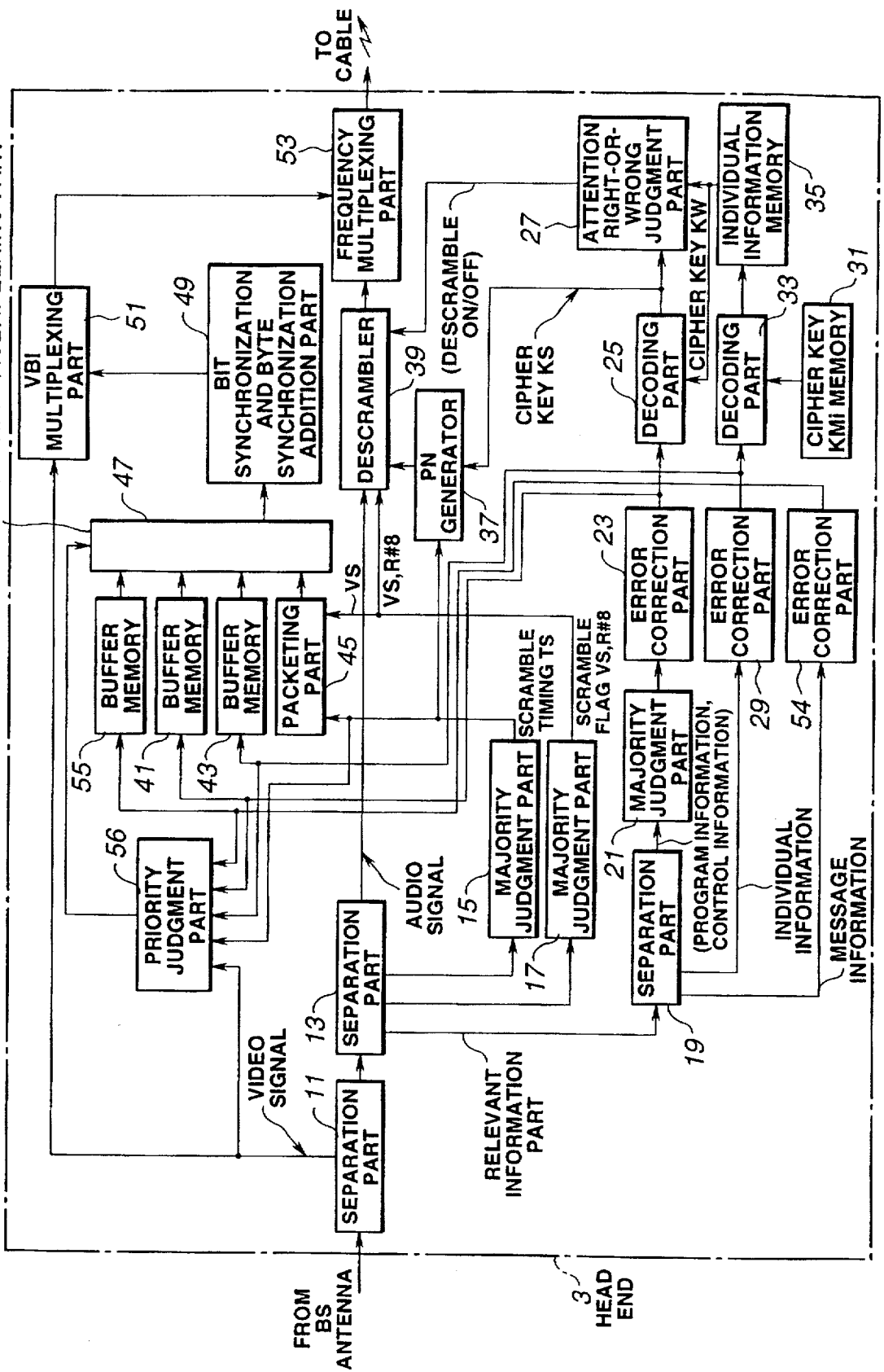
FIG. 1 is a block diagram showing a schematic arrangement of an embodiment of a head end of a concealment broadcasting apparatus according to the invention.
Figure 2:
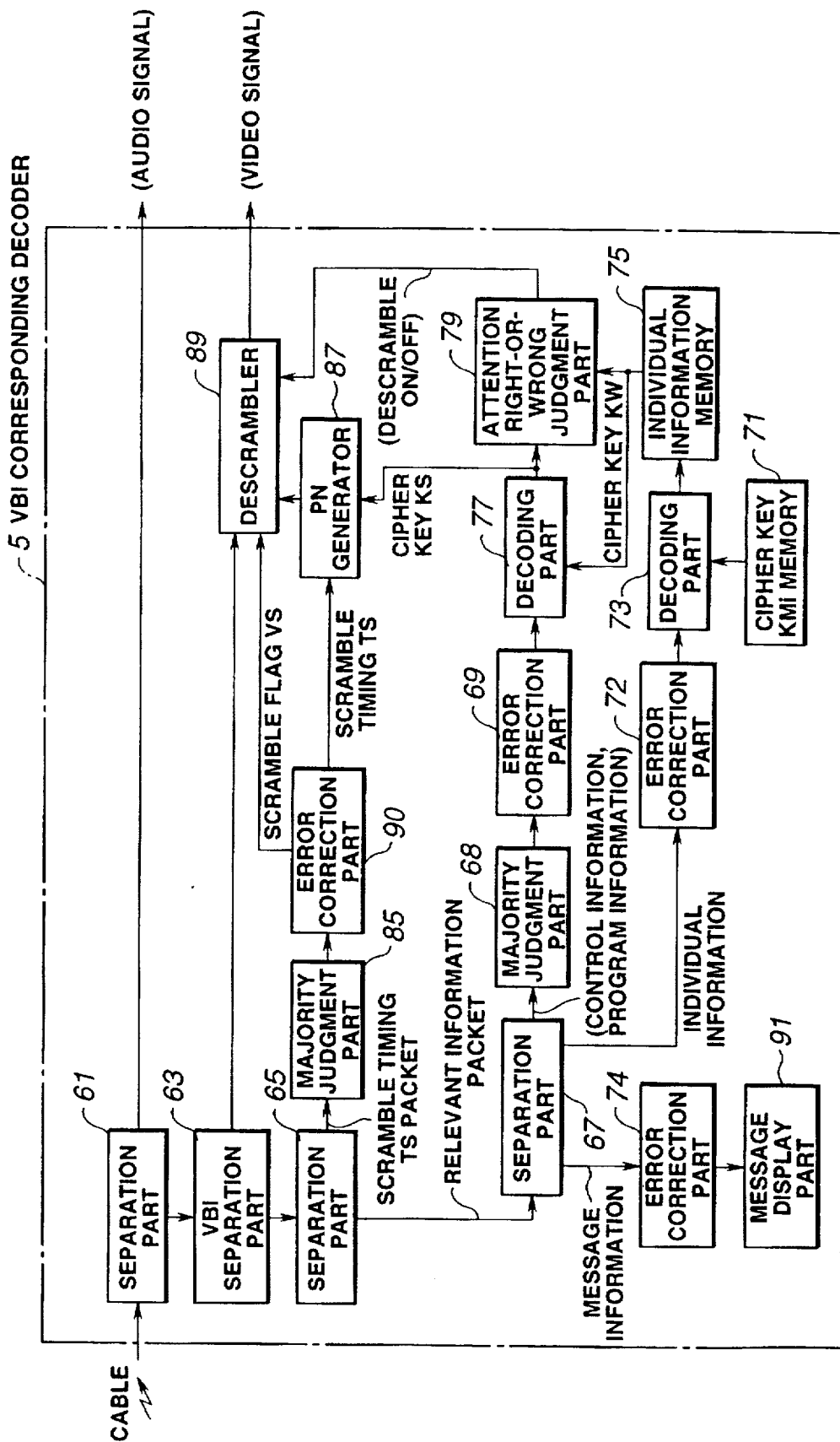
FIG. 2 is a block diagram showing a schematic arrangement of an embodiment of a VBI corresponding decoder which corresponds to that shown in FIG. 1.

FIG. 1 is a block diagram showing a schematic arrangement of an embodiment of a head end of a concealment broadcasting apparatus relating to the present invention. FIG. 2 is a block diagram showing a schematic arrangement of the a VBI corresponding decoder 5. In these figures, the same or identical reference numerals are applied to similar portions as those shown in FIG. 14 and FIG. 15, and the portions will be described. The present embodiment shows a chargeable satellite broadcasting receiving system of a COATEC system.

In FIG. 1, the head end 3 comprises the separation part 11 for separating the scramble video signal from the chargeable satellite broadcasting signal received by the BS antenna (not shown) and for supplying the scramble video signal to the separation part 13, the VBI multiplexing part 51 and a priority judgment part 56. The separation part 13 is connected to the separation part 11 for separating the scramble audio signal and for supplying the descramble audio signal to the descrambler 39, for separating the scramble timing TS and for outputting the same to the majority judgment part 15, for separating the scramble flag VS and the scramble flag R#8 and for outputting the same to the majority judgment part 17, and for separating the relevant information having the common information (the program information and the control information), the individual information and the message information and for outputting the same to the separation part 19. The majority judgment part 15 judges, in majority, the scramble timing TS and outputs the judgment results respectively to the PN generator 37, the packeting part 45 and the priority judgment part 56. The majority judgment part 17 judges, in majority, the scramble flag VS and outputs the judgment results respectively to the descrambler 39 and the packeting part 45. The separation part 19 separates the individual information and outputs the same to the error correction part 29, separates the common information (the program information and the control information) and outputs the same to the majority judgment part 21, and separates the message information and outputs the same to the error correction part 54. The majority judgment part 21 judges, in majority, the common information and outputs the judgment results to error correction part 23. Error correction part 23 corrects errors in the judgment results and outputs the corrected result to the decoding part 25, the buffer memory 41 and the priority judgment part 56. The decoding part 25 decodes the program information and the control information, outputs the decoded information to the attention right-or-wrong judgment part 27, and outputs the PN initial value to the PN generator 37. The attention right-or-wrong judgment part 27 judges right or wrong of attention and outputs judgment results thereof to the descrambler 39. The error correction part 29, which acquires the individual information received from separation part 19, corrects the errors in the individual information and outputs the corrected individual information to the decoding part 33, the buffer memory 43 and the priority judgment part 56. The error correction part 54 outputs the message information received from the separation part 19 to the buffer memory 55 and the priority judgment part 56. The decoding part 33 decodes the individual information received from the error correction part 29 on the basis of the encryption keys KMi that are read out from the encryption key KMi memory 31, and outputs the same to the individual information memory 35. The individual information memory 35 stores the individual information which is decoded by the decoding part 33. The PN generator 37 generates the pseudorandom (PN) signal on the basis of the PN initial value which is outputted from the decoding part 25. The descrambler 39 descrambles the audio signal received from the separation part 13 and outputs the same to the frequency multiplexing part 53. The buffer memory 41 temporarily stores the program information and the control information received from the error correction part 23. The buffer memory 43 temporarily stores the individual information received from the error correction part 29. The buffer memory 55 temporarily stores the message information from the error correction part 54. The packeting part 45 packets the scramble timing TS and the scramble flag VS. The time-sharing multiplexing part 47 receives the common information packets (the program information and the control information packet), the individual information packets and the message information packets from the buffer memory 41, the buffer memory 43 and the buffer memory 55, respectively. The time-sharing multiplexing part 47 also receives the scramble timing TS packets from the packeting part 45. The time-sharing multiplexing part 47 applies a priority order to those packets based on the priority judgment signal received from the priority judgment part 56, and outputs the same in time sharing. The priority judgment part 56 receives the scramble timing TS, the packets of the common information, the individual information and the message information, and the video signal from the separation part 11. The priority judgment part 56 generates the priority judgment signal for applying the priority order to the scramble timing TS packet from the packeting part 45, the common information (the program information and the control information) packets from the buffer memory 41, the individual information packets from the buffer memory 43 and the message information packets from buffer memory 55 during a predetermined superimposition timing period of time of the video signal when the time-sharing multiplexing is conducted. The priority judgment part 56 supplies the priority judgment signal to the time-sharing multiplexing part 47. The bit-synchronization and byte-synchronization addition part 49 adds bit synchronization and byte synchronization to the signal output from the time-sharing multiplexing part 47. The VBI multiplexing part 51 multiplexes the output signal upon the vertical blanking period of the scramble video signal output by the separation part 11. The frequency multiplexing part 53 multiplexes, in frequency, the output signal upon the audio signal descrambled by the descrambler 39.

Further, as shown in FIG. 2, the VBI corresponding decoder 5 comprises the separation part 51 for separating the descrambled audio signal and for outputting the same. The VBI separation part 63 separates the scramble video signal which is VBI-multiplexed by the VBI multiplexing part 51 of the head end 1, and outputs the same to the descrambler 89. The separation part 65 separates the relevant information packets (the packets of the common information, the individual information and the message information), and the scramble timing TS packets (the packeted scramble flag VS and scramble timing TS) from the VBI-multiplexed scramble video signal. The separation part 67 separates the packets of the common information (the program information and the control information), the individual information and the message information from the separated relevant information packets. The majority judgment part 68 judges, the majority, the separated common information (the program information and the control information) packets. The error correction part 69 corrects errors in the common information packets which have been judged in majority. The error correction part 72 corrects errors in the individual information packets which are separated from each other by the separation part 67. The decoding part 73 decodes the individual information packets, which have been corrected in error, by the use of the encryption keys KMi from encryption key KMi memory 71. The individual information memory 75 stores the decoded individual information. The decoding part 77 decodes the common information (the program information and the control information) packets which have been corrected in error, by the use of the encryption keys KW. The attention right-or-wrong judgment part 79 compares the decoded program information and the data within the individual information memory 75 with each other to conduct the attention right-or-wrong judgment, to thereby ON- and OFF-control the descrambler 89 in accordance with the judgment. The majority judgment part 85 judges, in majority, the scramble timing TS packets which are separated from each other by the separation part 65. An error correction part 90 corrects errors in output from the majority judgment part 85. The error correction part 90 outputs the scramble flag VS to the descrambler 89 and outputs the scramble timing TS to the PN generator 87. The PN generator 87 generates the pseudorandom (PN) signal based on the scramble timing TS and the PN initial value KS. The descrambler 89 descrambles the scramble video signal from the VBI separation part 63 on the basis of the scramble flag VS from the majority judgment part 85 and the PN signal from the PN generator 87, and outputs the same. The error correction part 74 corrects errors in the message information packets which are separated from each other by the separation part 67. The message display part 91 displays the error-corrected message information packets.

Operation of the head end 3 in the present embodiment will subsequently be described with reference to FIG. 1.

First, in the head end 3 illustrated by FIG. 1, the scramble video and audio signals are separated from each other by the separation part 11. Thereafter, separation part 13 separates the scramble flag VS, the scramble flag R#8, the scramble timing TS, which are multiplexed upon the scramble audio signal, and the relevant information packets in which the relevant information is packeted. After the separated scramble timing TS has undergone the majority judgment at the majority judgment part 15, the scramble timing TS is inputted to the PN generator 37, the packeting part 45 and the priority judgment part 56. After the majority judgment has been conducted at the majority judgment part 17, the scramble flag VS and the scramble flag R#8 are both inputted to the descrambler 39. The scramble flag VS is inputted also to the packeting part 45. In this connection, the scramble flag R#8 is not transmitted to the packeting part 45.

In the separation part 19, the relevant information packet is separated into the common information (the program information and the control information), the individual information and the message information in accordance with the sort identification in the data. Of them, the common information (the program information and the control information) undergoes the majority judgment at the majority judgment part 21, as well as the error correction by the error correction part 23. Thereafter, the common information is inputted to the decoding part 25, the buffer memory 41, and the priority judgment part 56. Furthermore, after the error correction has been conducted on the individual information at the error correction part 29, the individual information is inputted to the decoding part 33, the buffer memory 43 and the priority judgment part 56. After the error correction has been conducted on the message information at the error correction part 54, the message information is inputted to the buffer memory 55 and the priority judgment part 56.

In the common information (the program information and the control information), the encryption keys KS or the like are decoded in the decoding part 25 based on the encryption keys KW which are stored in the individual information memory 35. The PN initial value KS is inputted to the PN generator 37. The other data are given to the attention right-or-wrong judgment part 27. The encryption keys KW or the like are decoded in the decoding part 33 by the use of the encryption keys KMi, and, thereafter, the individual information is stored in the individual information memory 35.

The scramble audio signal which is separated by the separation part 13 is descrambled by the descrambler 39 in accordance with the scramble flag VS and R#8 and the PN signal, and is inputted to the frequency multiplexing part 53.

The relevant information packets which are outputted from the error correction parts 23, 29 and 54 are inputted to the priority judgment part 56. Since temporal holding or retention of the data and conversion of the data rate are required before the packets can be multiplexed upon the VBI, the relevant information packets are stored in three buffer memories including the buffer memory 41, the buffer memory 43 and the buffer memory 55. Of them, the common information (the program information and the control information) packets are stored in the buffer memory 41 and, thereafter, the same data are read out a plurality of times for successive sending.

Meanwhile, the scramble video signal, which is separated by the separation part 11, is inputted to the VBI multiplexing part 51 and supplied to the priority judgment part 56. The priority judgment part 56 receives the scramble video signal, the scramble timing TS packets, the common information packets, the individual information packets, and the message information packets from the separation part 11. Upon conducting the time-sharing multiplexing, the priority judgment signal is outputted to apply the priority order to the scramble timing TS packets from the packeting part 45, the common information (the program information and the control information) packets from the buffer memory 41, the individual information packets from the buffer memory 43 and the message information packets from the buffer memory 55, during the period of superimposition (multiple) timing time (during a specific period of time in the vertical blanking period of time) of the scramble video signal, to supply the same to the time-sharing multiplexing part 47.

In the time-sharing multiplexing part 47, the priority order established in the priority judgment signal from the priority judgment part 56 is applied to the common information (the program information and the control information) packets, the individual information packets, the message information packets and the scramble timing TS packets in which the scramble timing TS and the scramble flag VS are packeted in the packeting part 45. Based on the applied priority order, the packets are multiplexed upon each other in time sharing. Bit synchronization and byte synchronization, similar to those of the character multiple broadcasting, are added by the bit-synchronization and byte-synchronization addition part 46.

Moreover, similar to the character multiple broadcasting, the signal is multiplexed (superimposed) by the VBI multiplexer of the VBI multiplexing part 51 upon the VBI of the video signals which is not descrambled (i.e., scramble video signal). The VBI multiple period of time is the seventeenth and nineteenth lines of the first field of the video signal and the two hundred and eightieth and two hundred and eighty-second lines of the second field. These positions are selected in consideration of compatibility with respect to the character multiple broadcasting.

The frequency multiplexing part 53 remodulates (RF-modulates) the scramble video signal (a signal in which the packets are VBI-multiplexed upon each other) from the VBI multiplexing part 51, remodulates (RF-modulates) the audio signal from the descrambler 39, frequency multiplexes both the signals upon each other, and outputs the multiplexed product to a cable (not shown).

Through the described operation and orientation, the chargeable satellite broadcasting and the character multiple broadcasting can be similarly treated or handled. That is, in the chargeable satellite broadcasting system, the first eight bits of a data region having 272 bits are the sort identification used for identification of a program information, the control information, the individual information and the message information. Similarly, in the character multiple broadcasting, the first eight bits of data having 272 bits are sort classification codes, and data different from each other every packets are allocated whereby the packets are identified on the receiving side.

Thus, in order to VBI-multiplex and output the relevant information packets in the present embodiment, the bit synchronization and the byte synchronization similar to those in the character multiple broadcasting are added to 272 bits (except for the header from the relevant information packets in the chargeable satellite broadcasting) so that the data are made to 296 bits.

Figure 3:
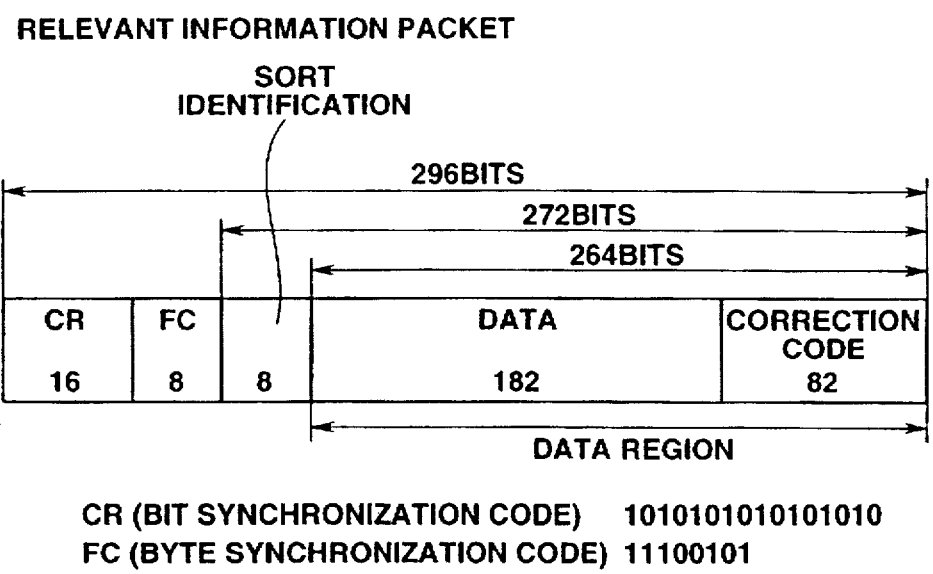
FIG. 3 is a view showing an arrangement of a relevant information packet which corresponds to that shown in FIG. 1.
Figure 4:
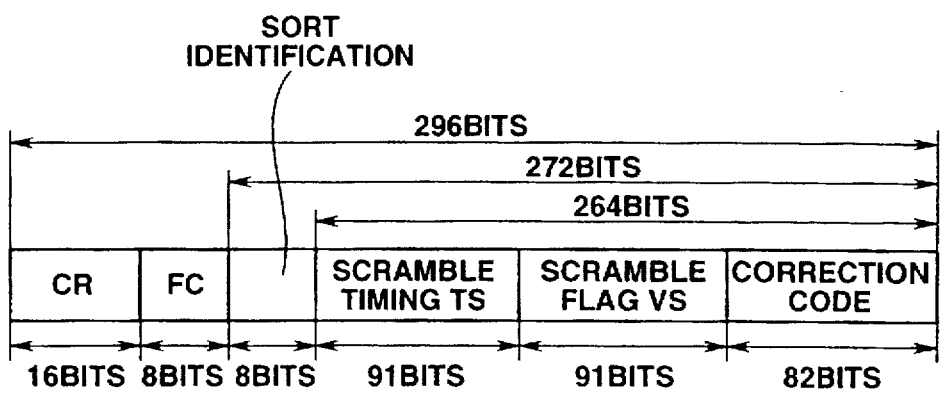
FIG. 4 is a view showing an example of an arrangement of a scramble timing TS packet which corresponds to that shown in FIG. 1.
Figure 5:
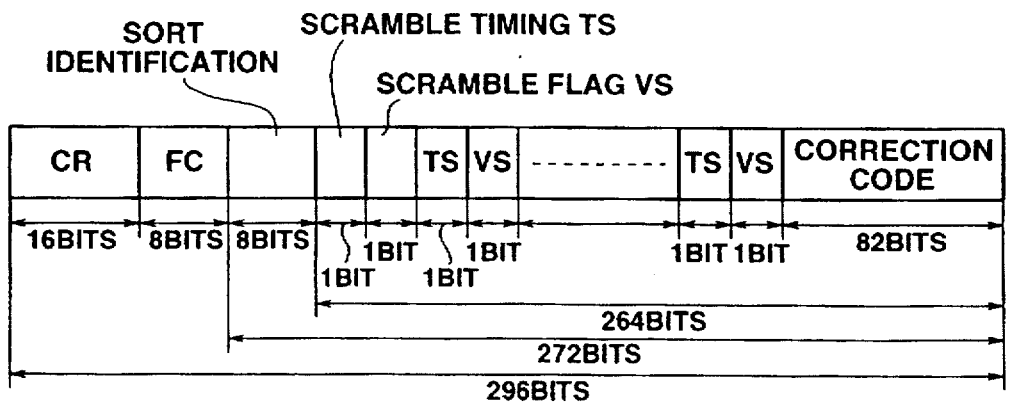
FIG. 5 is a view showing an example of an arrangement of the scramble timing TS packet which corresponds to that shown in FIG. 1.

FIG. 3 shows an arrangement example of the relevant information packets (the common information packets, the individual information packets and the message information packets), while FIG. 4 and FIG. 5 show an arrangement example of the scramble timing TS packets. Of the data region having 272 bits, the sort identification is 8 bits, the packet data are 182 bits and the error correction codes (redundant bit) are 82 bits. The arrangement of the scramble timing TS packets in FIG. 4 and FIG. 5 will be described in detail in the subsequent description of the packeting part 45.

Subsequently, the priority judgment part 56 will be described with reference to FIG. 6 to FIG. 8.

Figure 6:
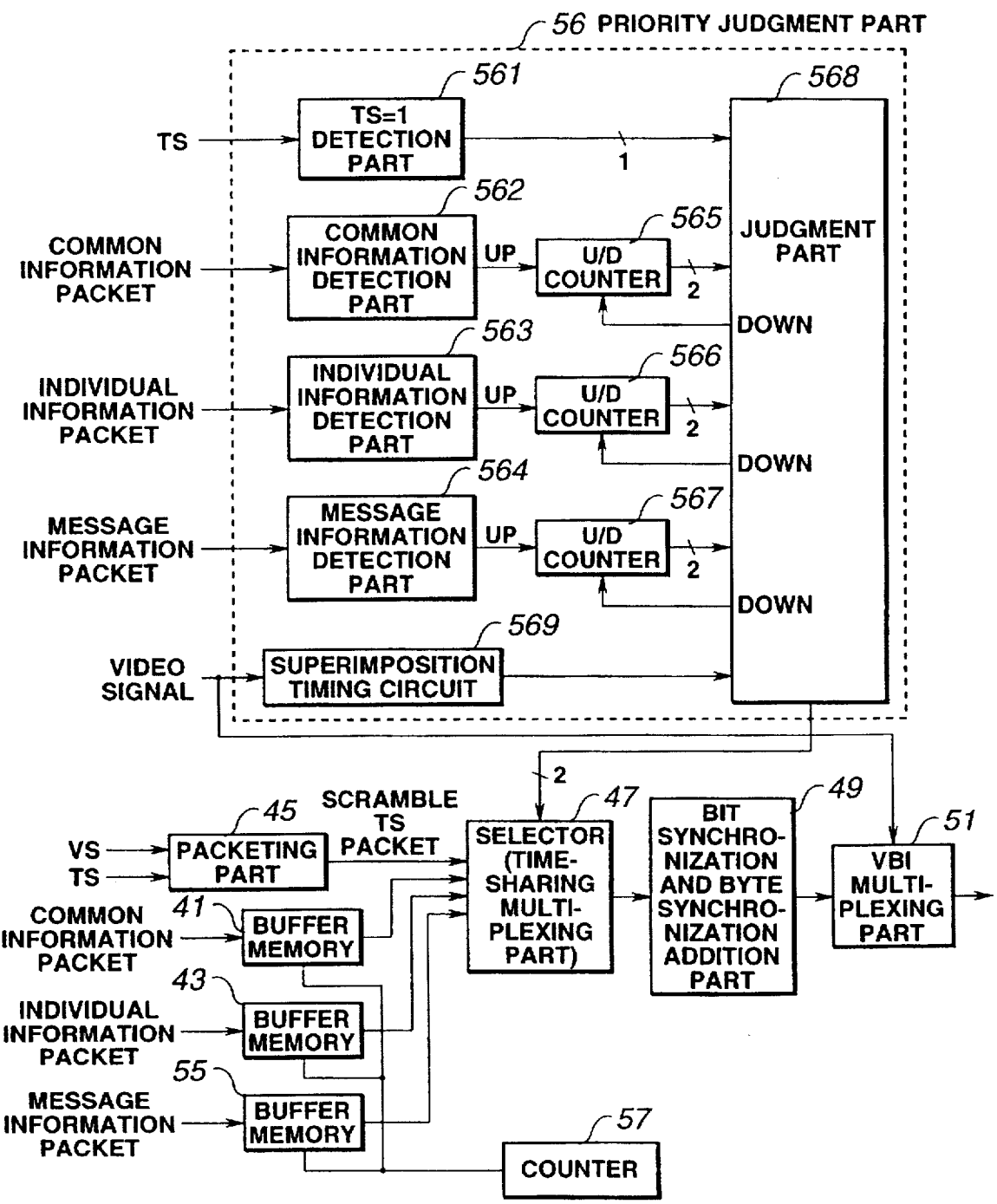
FIG. 6 is a block diagram showing an embodiment of an arrangement of a time-sharing multiplexing part, a priority judgment part and a buffer memory part in FIG. 1.

FIG. 6 shows an embodiment of the priority judgment part 56, the time-sharing multiplexing part 47 and the buffer memory part (41, 43 and 55). FIG. 7 shows a circuit view of a principal part in the priority judgment part 56 (shown in FIG. 6), while FIG. 8 shows a priority judgment signal relating to the priority order which is outputted from FIG. 7.

In FIG. 6, the priority judgment part 56 comprises a TS=1 detection part 561 for detecting existence or presence (i.e., "1" and "0") of the scramble timing TS. A common-information detection part 562, an individual-information detection part 563 and a message-information detection part 564 respectively detect existence of the common information (the program information and the control information) packets, the individual information packets and the message information packets from the packet separation part. Up- and down-counters 565, 566 and 567 of 2 bits, count up each time a respective one of the information detection parts 562, 563 and 564 detect information, the up- and down-counters 565, 566 and 567 being capable of holding or retaining the detection information for 4 counts, the up- and down-counters 565, 566 and 567 being counted down each time the retained detection information is outputted to a judgment part 568. A superimposing timing circuit 569 sets a specific period of time as superimposing timing in a VBI of a video signal when the time-sharing multiplexing is conducted at the time-sharing multiplexing part 47. The judgment part 568 receives the following signals during the superimposition timing period of time: a detection signal showing that the scramble timing TS is present, the counter signal showing that the common information packets are detected, the counter signal showing that the common information packets are detected, and the counter signal showing that the message information packets are detected. The judgment part 568 identifies those packets which have preference or priority upon multiplexing, corresponding to presence of each of the ddetection signals.

The priority judgment signal from the priority judgment part 56 is supplied to the time-sharing multiplexing part 47 which is formed by a selector. The selector 47 has four input terminals. The scramble timing TS packets from the packeting part 45, the common information packets from he buffer memories 41, 43 and 55, the individual information packets and the message information packets are inputted to the input terminals of selector 47. The selector 47 successively selects (i.e., multiplexes in time sharing) the four packet inputs in accordance with the priority or the priority order of the packets, which is indicated by the priority judgment signal, and outputs the same. The buffer memories 41, 43 and 55 are controlled in reading-out in accordance with the bit count of the counter 57. Thereafter, the bit synchronization code and the byte synchronization code are added by the bit synchronization and byte synchronization addition part 49 to the packets which are multiplexed in time sharing, are supplied to the VBI multiplexing part 51 together with the scramble video signal, and are multiplexed upon the VBI of the scramble video signal.

The aforesaid TS=1 detection part 561 outputs "1" if there is the scramble timing TS. Further, the counters 565, 566 and 567 also output "1" if there is a count output.

Figures 7, 8:
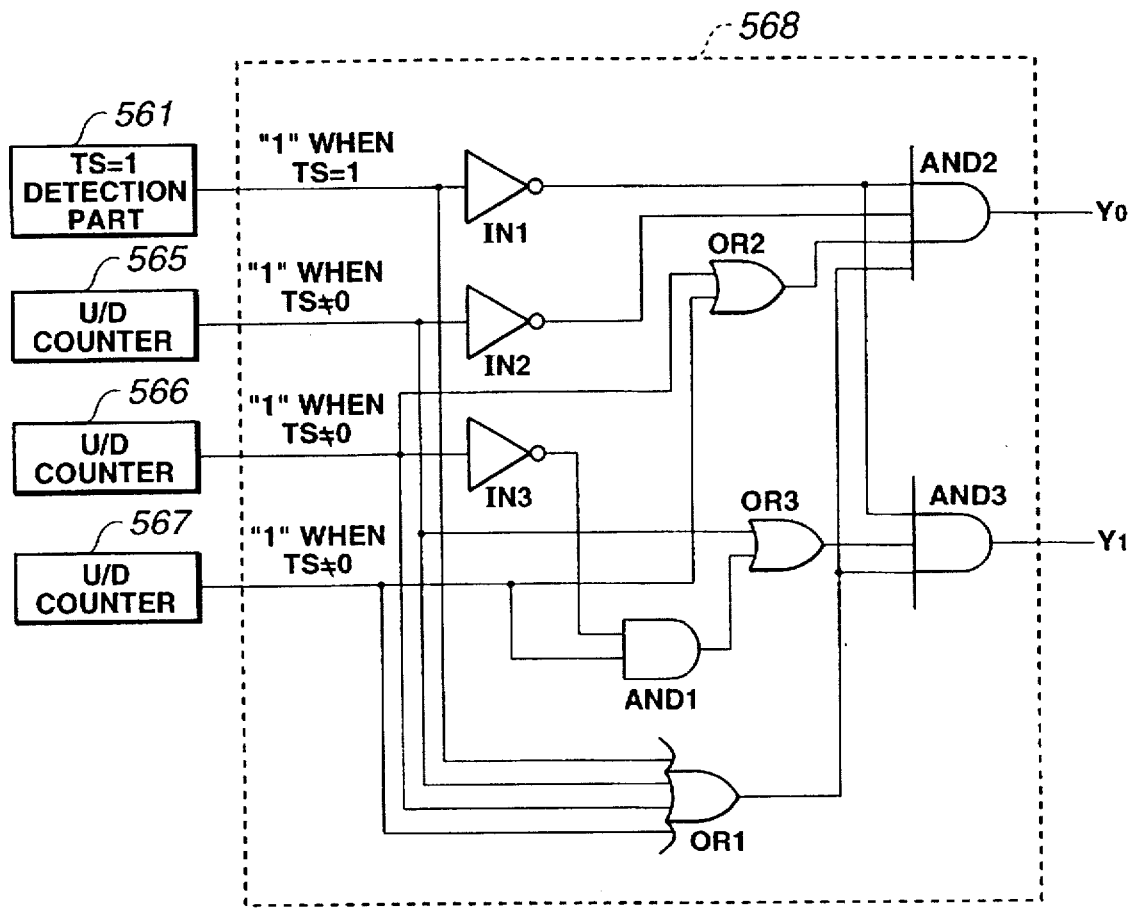
FIG. 7 is a circuit view showing an embodiment of an arrangement of a judgment part in FIG. 6.
FIG. 8 is a view showing a priority judgment signal in FIG. 7.

As shown in FIG. 7, the aforementioned judgment part 568 comprises an inverter IN1 into which an output from the TS=1 detection part 561 is inputted, an inverter IN2 to which an output from the counter 565 is inputted, an inverter IN3 to which an output from the counter 566 is inputted, an OR circuit OR1 having four inputs to which the output from the TS=1 detection part 561 and the output from the counters 565, 566 and 567 are inputted, an OR circuit OR2 to which the respective outputs from the counters 566 and 567 are inputted, and AND circuit AND1 to which an output from the inverter IN3 and an output from the counter 567 are inputted, an OR circuit OR3 to which the output from the counter 5465 and an output from the AND circuit AND 1 are inputted, an AND circuit AND2 having four inputs to which the outputs from the respective inverters IN1 and IN2 and the outputs from the respective OR circuits OR2 and OR1 are inputted, and an AND circuit AND 3 to which the output from the inverter IN1 and the outputs from the respective OR circuits OR3 and OR1 are inputted. An output Y0 is outputted from the AND circuit AND2, and an output Y1 is outputted from the AND circuit AND3. The priority judgment signal of 2 bits is formed by the output (Y0, Y1), the priority judgment signal being supplied to the aforementioned selector 47.

FIG. 8 shows the priority judgment signals corresponding respectively to the packets which are supplied to the selector 47 in FIG. 6. In the selector 47, if the output from the TS=1 detection part 561 is "1", (Y0, Y1) becomes (0, 0) regardless whether the respective outputs from the counters 565–567 are "1" or "0". The selector 47 preferentially selects the scramble timing TS packets from the packeting part 45, and outputs the same. Moreover, if the output from the counter 566 is "1" under the condition that the output from the TS=1 detection 561 is "0", (Y0, Y1) becomes (0, 1) regardless of the outputs from the other counters 566 and 567. In such a case, the selector 47 preferentially selects the common information packets from the buffer memory 41, and outputs the same. Furthermore, if the output from the counter 566 is "1", assuming the output from the TS=1 detection part 561 is "0" and the output from the counter 565 is "0", (Y0, Y1) becomes (1, 0) regardless of the output from the other counter 567. In such a case, the selector 47 selects the individual information packets from the buffer memory 43, and outputs the same. Further, if the output from the TS=1 detection part 561 is "0", assuming the output from the counter 565 is "0", the output from the counter 566 is "0" and the output from only the counter 567 is "1", (Y0, Y1) becomes (1, 1). In this case, the selector 47 selects the message information packet from the buffer memory 55, and outputs the same. Accordingly, the priority order in which the four packets inputted to the selector 47 are selected and outputted becomes that shown in FIG. 8.

Furthermore, in FIG. 7, when the scramble timing TS is "0", and the respective outputs from the other counters 565–567 are "0" (that is, when there is no scramble timing TS and there are no packets of the common information, the individual information and the message information), the judgment signal (Y0, Y1) becomes (0, 0). As such, values of the TS and VS packets (that is, the scramble timing TS packet from the packeting part 45 are selected and are outputted. From the above, it is possible to determine or decide the packet priority order at the time the plurality (four are shown, e.g., in the figure) of inputted packets are multiplexed upon each other in time sharing (are VBI-multiplexed upon each other, as a consequence). Further, even when there are entirely no input packets, the TS and VS packets are outputted. Accordingly, there is always a free area in the VBI multiplexing part of the video signal. Thus, it is possible to hold or retain the continuity of the descramble processing in the VBI corresponding decoder 5.

Subsequently, a description will be provided for the packeting part 45 which packets the scramble timing TS and the scramble flag VS.

Figure 9:
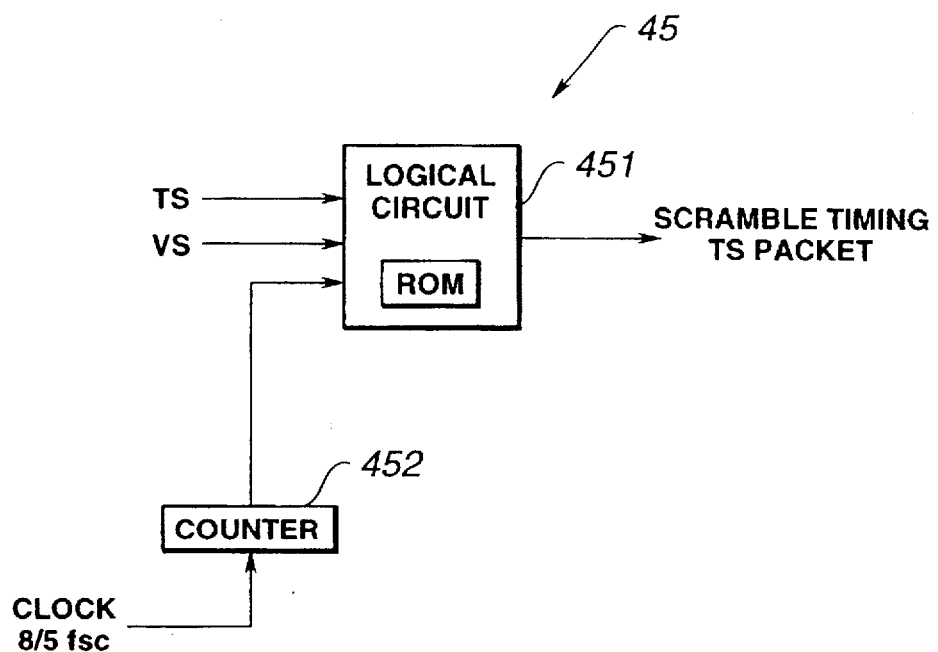
FIG. 9 is a block diagram showing an embodiment of an arrangement of a packeting part in FIG. 1.

FIG. 9 shows an embodiment of the packeting part 45.

In FIG. 9, the scramble timing TS and the scramble flag VS are inputted to a logical circuit 451. The TS and VS packets (the scramble timing TS packets), to which SDSC codes of 82 bits are added are outputted from the logical circuit 451. In this connection, SDSC is an abbreviation of a (272, 190) shortened difference set cyclic code which is employed in the chargeable satellite broadcasting system. The logical circuit 451 has a ROM. The scramble timing TS and the scramble flag VS which are supplied to the logical circuit 451, as inputs, have four combinations (TS, VS) including (0, 0), (0, 1), (1, 0) and (1, 1). Accordingly, the SDSC codes (82 bits), which have previously been ended in calculation, are stored in the ROM corresponding to the four inputs. The appropriate SDSC code is therefore read out in accordance with the aforementioned four input values and is added to the input value, whereby the packeting of the TS and the VS is realized. Thus, time is not required to SDSC-code the input data at that time, and a circuit arrangement of the packeting part 45 is simplified. Moreover, when the error correction is conducted by the VBI corresponding decoder, it is possible to raise the correction probability. In this connection, in order to read out the SDSC codes from the ROM, the counter 452 is used which conducts count operation by clocks (this clock frequency is (8/5) of color subcarrier frequency fsc).

It is assumed that, in the packeting part 45, the sort identification is sent by the first 8 bits in the data region having 272 bits, where the sort identification is different from the common information (the program information and the control information), the individual information and the message information, [11111111], for example. The data of the scramble timing TS and the scramble flag VS are transmitted by 182 bits of the remaining 264 bits, and the error correction code of the data is transmitted by 82 bits.

FIG. 4 and FIG. 5 show an arrangement example of the scramble timing TS packet. In this connection, the sort identification of the common information (the program information and the control information) is [01111000], and the sort identification of the individual information is [10000111].

First, it is assumed that, in FIG. 4, the scramble timing TS and the scramble flag VS are those which transmit data of 91 bits respectively, the data of the scramble timing TS and the scramble flag VS are all 0 or all 1, and the data are judged in majority on the decoder side. The majority judgment is processing in which a zero is produced if data equal to or more than a predetermined number of the 91 bits of data, for example, are 0, and where a 1 is produced if the data are less than that. For example, the scramble timing TS is arranged as follows: if the data equal to or more than 72 bits are 1, it is deemed to be the scramble timing TS. The scramble flag VS is such that, if data equal to or more than 72 bits are 1, it is deemed to be scramble; if data equal to or more than 72 bits are 0, it is deemed to be non-scramble.

Subsequently, FIG. 5 shows that each of the scramble timing TS and the scramble flag VS transmits data of 91 bits, like FIG. 4. However, the scramble timing TS and the scramble flag VS are delimited ever predetermined number of bits (i.e., FIG. 5 shows one bit) and are alternately transmitted whereby an error of each of the scramble timing TS and the scramble flag VS is reduced to ½ with respect to a transmitting error which is generated in the form of burst. Thus, an attempt is made to improve the security.

Subsequently, the description of the VBI corresponding decoder 5 shown in FIG. 2 will be conducted. In the VBI corresponding decoder 5, the audio signal and the scramble video signal that have been multiplexed in frequency are first separated from each other by the separation part 61, and the packets that have been multiplexed during the vertical blanking period of the scramble video signal are separated from each other by the VBI separation part 63. A signal processing IC (a waveform equivalent IC, a synchronization separation IC, a character multiple extracting IC or the like), which has been developed for character multiple broadcasting receiving, can be utilized to the VBI separation part 63. The packets which are separated from each other by the VBI separation part 63 are separated into relevant information packets and the scramble timing TS packets in accordance with the sort thereof in the separation part 65.

The scramble timing TS packets separated from each other by the separation part 65 are judged in majority in the majority judgment part 85 so that the scramble timing TS and the scramble flag VS are extracted. As described in the description of FIG. 4, the majority judgment part 85 carries the majority judgment processing into practice within the data of the scramble timing TS packets. The extracted scramble timing TS and scramble flag VS, and combination (TS and VS) thereof are corrected by the SDSC codes in the error correction part 90. By the error correction, the returning probability is raised if the value of the VS is erroneous at the TS and VS packets when TS=1. The scramble timing TS and the scramble flag VS are inputted respectively to the PN generator 87 and the descrambler 89. In the descrambler 89, the continuity of the descramble processing is retained or held even when there is free area in the VBI superimposing part of the video signal, in the preferential processing of the packets in the head end (refer to FIG. 11).

Moreover, based on the sort identification from the separation part 67, the relevant information packets are separated from each other by the separation part 65 into packets including: the common information (the program information and the control information), the individual information and the message information. Of them, the common information (the program information and the control information) packets are judged in majority in the majority judgment part 68. The judgment result passes through the error correction part 69 and is inputted to the decoding part 77. In the majority judgment part 68, the data of the common information packets, which is successively sent from the head end 3, is judged in majority. Moreover, the individual information packets pass through the error correction part 72 and, thereafter, are inputted to the decoding part 73. Since the message information packet is not enciphered, the message information packets pass through the error correction part 74 and, thereafter, are displayed at the message display part 91, as is.

The common information (the program information and the control information) packets are arranged such that the encryptions are decoded by the decoding part 77 based on the encryption keys KW. The obtained or acquired PN initial value KS is inputted to the PN generator 87. The other data are given to the attention right-and-wrong judgment part 79. The individual information packets are such that the encryptions are decoded by the use of the encryption keys KMi, by the decoding part 73 and, thereafter, the individual information packet is stored in the individual information memory 75.

The attention right-or-wrong judgment part 79 compares the program information to the data within the individual information memory 75, and conducts attention right-or-wrong judgment. According to the judgment, the descrambler 89 may or may not conduct a descramble operation. Specifically, the arrangement is such that the decoder cannot conduct descramble and cannot conduct attention when the contents of the individual information are not suited with the program so that the results of the attention right-or-wrong judgment are "no".

In the decoder described above, the packets are processed in priority or preference by the head end, in the order received by the decoder. Accordingly, a time space or blank is eliminated in the descramble processing, and the continuity of the descramble processing is held or retained.

Subsequently, protection against the errors of the relevant information packets and the scramble timing TS packets will be described.

In the chargeable satellite broadcasting system, if the relevant information packets (e.g. scramble timing TS, the scramble flag VS and the scramble flag R#8) cannot correctly be received, the descramble becomes impossible. Accordingly, it will be necessary to conduct protection against the errors in consideration of an error ratio which is generated in the transmission path.

A method of protection with respect to the errors will be described. However, this includes a method of successively sending the same packets, a method of adding the error correction codes to conduct correction or revision, and a method of successively sending the same data (all 0, all 1 or the like, for example) so that the data are judged, in majority, on the receiving side, or the like. In view of this, the protection against the errors as shown in the following (1)~(3) is conducted with respect to the relevant information packets and the scramble timing TS packets.

(1) Packet Successive Sending (Head End):

The common information (the program information and the control information packets: Two lines during the vertical blanking period are utilized to successively send (e.g., thrice) the same packets over two fields;

The individual information packets: No successive sending;

The message information packets: No successive sending; and

The scramble timing TS packets: When the scramble timing TS=1, two lines during the vertical blanking period are used to successively send (e.g., twice) the same packets over one filed. Regarding the scramble timing TS packets, the arrangement is such that the majority judgment processing within the data is carried into practice on the decoder side as described previously. Successively sending is conducted to improve the error ratio due to the successive sending on the decoder side. When TS=0, the successive sending is not conducted.

(2) The sort identification and the error detection thereof (VBI corresponding decoder):

The common information (the program information and the control information) packets;

The sort identification: 01111000. The error of the sort identification of the common information packets is allowed until 2 bits error.

The individual information packets;

The sort identification: 10000111. Coincident detection of all bits is conducted.

The message information packets;

The sort identification: 00011101. The error of the sort identification of the scramble timing TS packets is allowed until 3 bits error.

(3) The packet data and the error correction thereof (VBI corresponding decoder):

The common information (the program information and the control information packets;
SDSC Correction The individual information packets;
SDSC Correction The message information packets;
SDSC Correction The scramble timing TS packets;
SDSC Correction With regard to the majority judgment of the common information packets on the decoder side, the majority judgment corresponding to thrice successive sending is conducted regarding each of the bit digits of the first bit ~ the $182^{nd}$ bit, with regard to the data portion 182 bits which are successively sent thrice. Specifically, regarding the same digit of the data portion of the packet, if the bit values equal to ore more than twice the bit values corresponding to thrice successive sending are the same as each other, the bit values equal to or more than twice are deemed to be a correct bit value. If the bit values equal to or more than twice are [0], it is judged as being [0]; if the bit values equal to or more than twice are [1], it is judged as being [1]. For example, with regard to the data consisting of 182 bits which are successively sent thrice, [0001 . . . ] is received by the twice transmission, [0101 . . . ] is received by the twice transmission, and [0111 . . . ] is received by the thrice transmission. Then, since, with regard to the first bit, three bits which are successively sent thrice are [0, 0, 0], it is judged as being [0] as a result of the majority judgment. Since, with regard to the second bit, three bits which are successively sent thrice are [0, 1, 1], it is judged as being [1] as a result of the majority judgment. Since, with regard to the third bit, three bits which are successively sent thrice are [0, 0, 1], it is judged as being [0] as a result of the majority judgment. Since, with regard to the fourth bit, three bits which are successively sent thrice are [1, 1, 1], it is judged as being [1] as a result of the majority judgment. Hereunder, the majority judgment is conducted similarly also regarding each of the digits until $182^{nd}$ bit. In this manner, the arrangement is such that the majority judgment is conducted by the unit of each of the digits of the packets which are transmitted so that the correct judgment result is first acquired.

In connection with the above, regarding the majority judgment of the data portion of the scramble timing TS packets on the decoder side, the majority method is changed in accordance with the errors of the sort identification.

When the error generation of the sort identification is 0 or 1 bit:

72/91 majority

When the error generation of the sort identification is 2 or 3 bits:

78/91 majority

Specifically, when the error generation ratio is less like the fact that the error at the sort identification code is 0 or 1, a threshold value thereof is made to 72 bits of 91 bits to reduce the threshold value of the majority. Further, when the error generation ratio is many like the fact that the error at the sort identification code is 2 or 3, a threshold value thereof is made to 78 bits of 91 bits to raise the threshold value of the majority.

Figure 10:
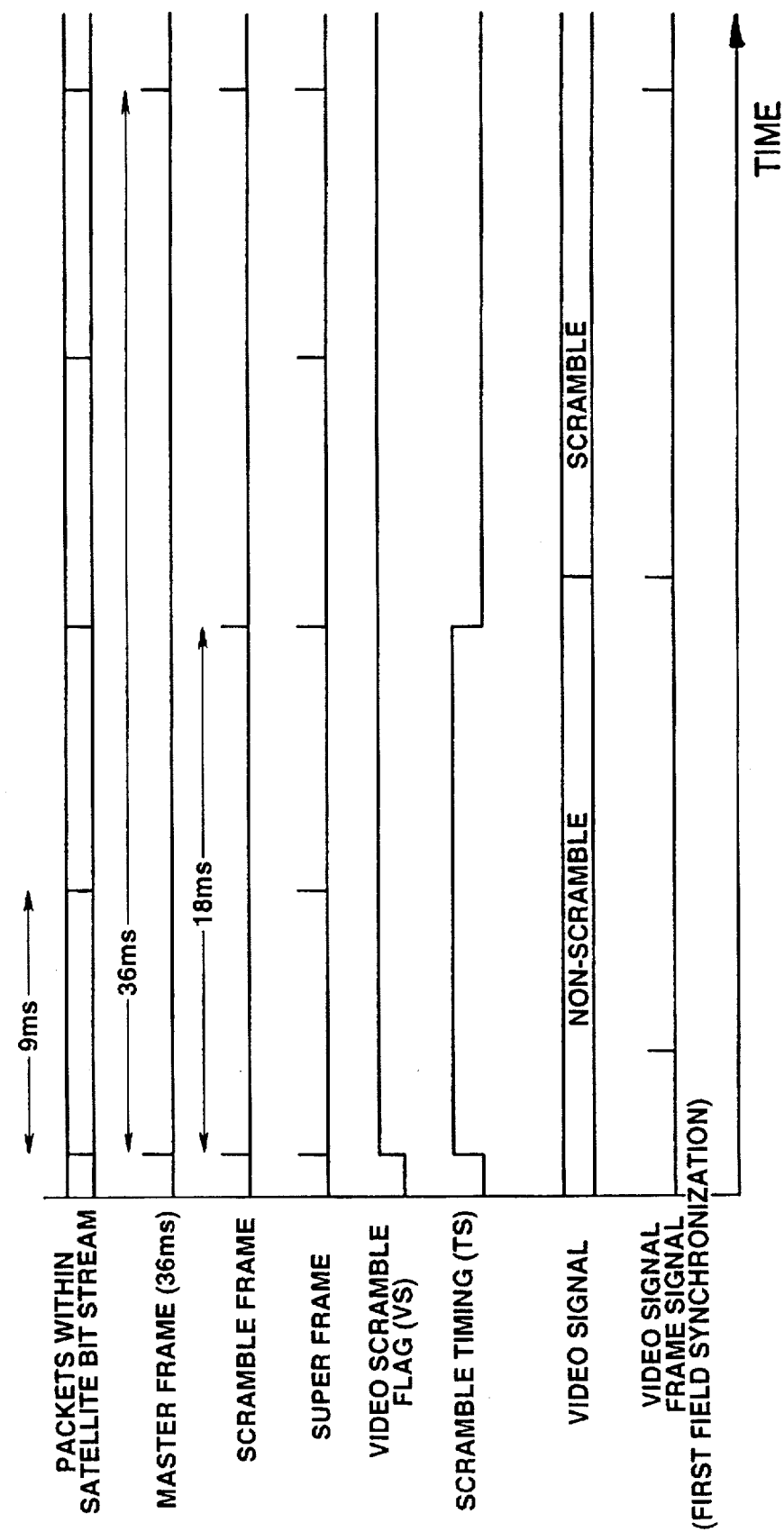
FIG. 10 is a timing chart of packets of a satellite system in the concealment broadcasting apparatus relating to the present invention.
Figure 11:
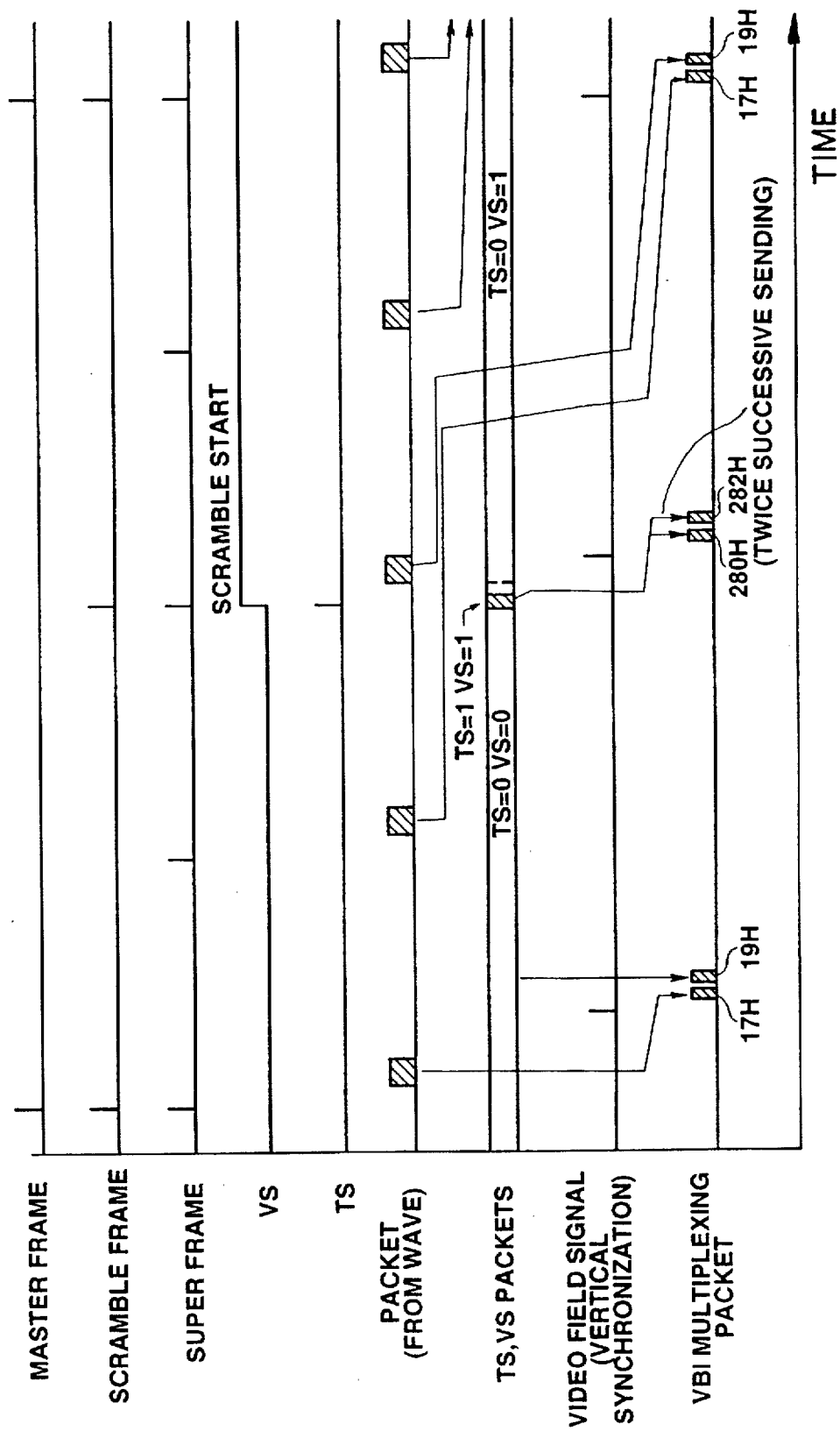
FIG. 11 is a timing chart showing an embodiment which packets and VBI-multiplexes the head end in the concealment broadcasting apparatus relating to the present invention.
Figure 12:
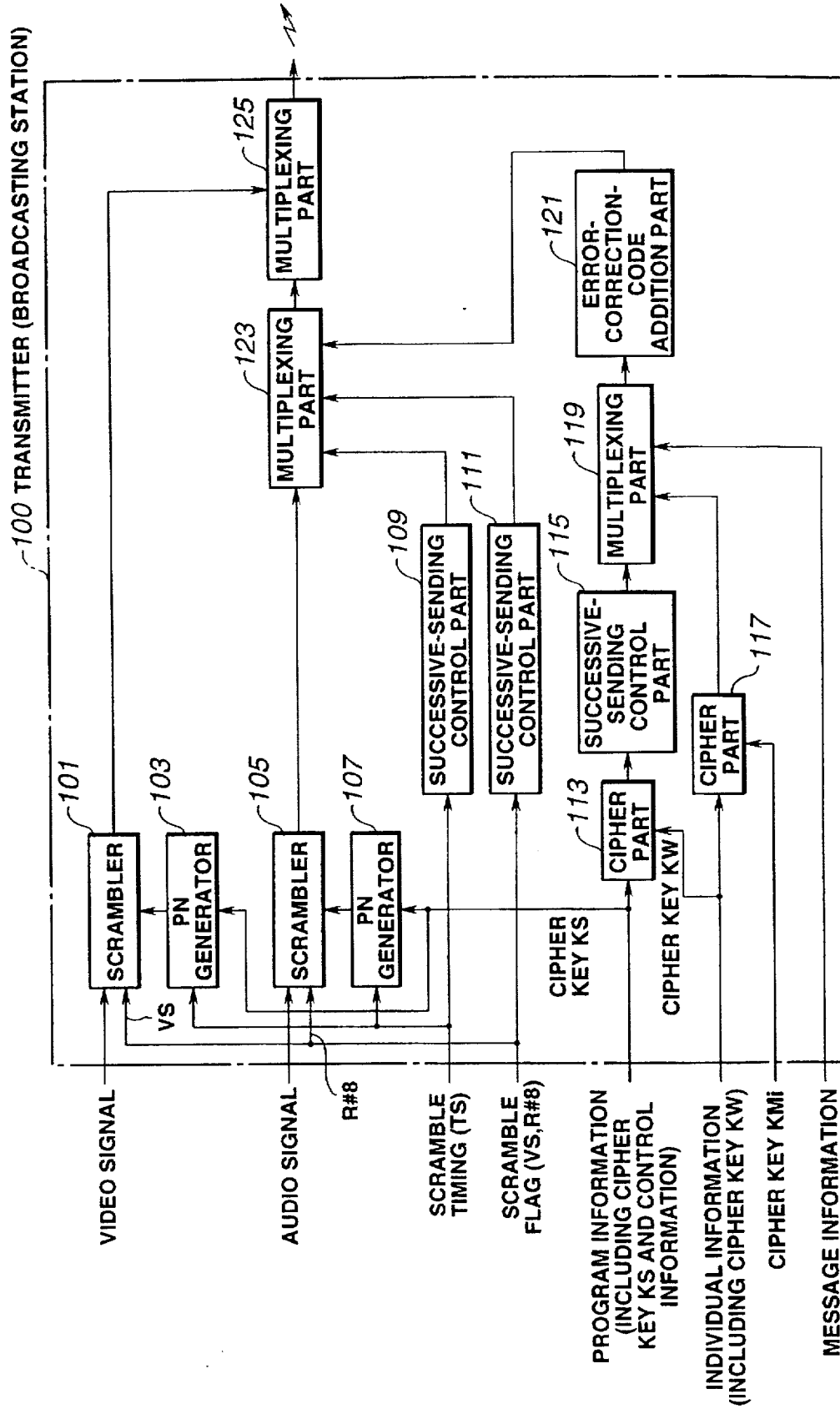
FIG. 12 is a block diagram showing a schematic arrangement of a transmitter of a COATEC system.

FIG. 10 shows a timing chart of the satellite system, while FIG. 11 shows a timing chart in the head end. In the satellite system, the packets are such that a single packet is superimposed for each super frame which has 9 frames of the audio data. In the head end, the packets corresponding to every super frame are transmitted in superimposition upon two lines of the video signal (the seventeenth and the nineteenth lines in the first field, the two-hundred and eightieth and the two-hundred and eighty-second lines in the second field) for each occurrence of the video field signal (the vertical synchronization signal). In FIG. 11, the relevant information packets from the satellite wave are shown to be superimposed upon the seventeenth line. If there is no relevant information in the subsequent nineteenth line (this time corresponds to case where there is no counter output from the counters 565~567 in FIG. 6), the priority judgment signal which is outputted from the judgment part 568 (refer to FIG. 7) becomes (0, 0) in the priority judgment part 56. In the time-sharing multiplexing part 47, the scramble timing TS packets (TS and VS packets) from the packeting part 45 are selected based on the priority judgment signal. Accordingly, the state or condition (TS=0 and VS=0) of the TS and VS packets at that time is outputted to the nineteenth line and is VBI-multiplexed).

If TS=1 before the subsequent video field signals comes, even if there is the relevant information packets, the priority judgment signal becomes (0, 0). Accordingly, the time-sharing multiplexing part 47 selects the scramble timing TS packets (the TS and VS packets) from the packeting part 45. The state of the TS and VS packets at that time (TS=1 and VS=1) is successively sent twice to the two-hundred eightieth and the two-hundred eighty-second lines, and is VBI-multiplexed.

Moreover, when the subsequent video field signal comes, 2 packets of the relevant information packets previous to this are outputted respectively to the seventeenth and the nineteenth lines of the subsequent video signal and are VIB-multiplexed.

In connection with the above, in the embodiment described above, it is assumed that the atmospheric system which transmits the signal by the wave from the transmitter to the head end through the satellite is the first signal transmission system, and the cable system which transmits the signal from the head end to the decoder (the terminal side) is the second signal transmission system. However, the invention can be applied to case where the first signal transmission system is the cable system, without being limited to case where the first signal transmission system is the atmospheric system.

In connection with the above, the present invention should not be limited only to the embodiments described above, but is capable of being variously modified and carried into practice within the scope which is not departed from the gist of the invention.

AVAILABILITY IN INDUSTRY

As described above, according to the invention, in the repeating device in which the information signal for conducting the descramble is packeted and is multiplexed upon the vertical blanking period of time of the video signal of the concealment satellite broadcasting, so as to be sent out to the cable, the information packets for conducting the descramble are multiplexed upon each other, in preference to the relevant information packets, upon packet multiple. Accordingly, it is possible to hold or retain the continuity of the descramble processing. Furthermore, upon packeting of the information signal for conducting the descramble, the information signal for conducting the descramble is encoded, and the error correction code corresponding thereto is read out from the memory means and is added. Accordingly, coding of the error correction is easy, and it is possible to provide the concealment broadcasting apparatus which is high in correction probability.

What is claimed is:

1. A repeating device for receiving a broadcasting signal which is transmitted through a first transmission system, and for sending the broadcasting signal to a second transmission system, wherein said broadcasting signal includes a scrambled signal, a first information signal for descrambling said scrambled signal, and relevant information packets, and wherein said repeating device comprises:

separation means for separating and extracting said scrambled signal, said first information signal and said relevant information packets from the broadcasting signal;

packeting means for generating first information-signal packets by packeting said first information signal; and multiplexing means for generating a multiplexed output by multiplexing said first information-signal packets and said relevant information packets upon said scrambled signal, and for outputting said multiplexed output to said second transmission system, said multiplexing means multiplexing said first information-signal packets upon each other, said first information-signal packets having preference over said relevant information packets with respect to an order of multiplexed packets within said multiplexed output.

2. A repeating device according to claim 1, wherein, when said relevant information packets are not included in said broadcasting signal, said multiplexing means generates said multiplexing output by multiplexing said first information-signal packets also to a part corresponding to a multiplexing area of said relevant information packets in said broadcasting signal.

3. A repeating device according to claim 1, wherein said packeting means is further provided with memory means for storing a plurality of error correction codes corresponding to signal contents of said first information signal, where said error correction codes are read from said memory and added to said first information signal when said first information signal is packeted.

4. A decoder for receiving a broadcasting signal which includes a scrambled signal, first information-signal packets for descrambling said scrambled signal, and relevant information packets, wherein said broadcasting signal is such that said first information-signal packets and said relevant information packets are multiplexed upon said scrambled signal, and said first information-signal packets are multiplexed upon each other, said first information-signal packets having preference over said relevant information packets with respect to an order of multiplexed packets, and wherein said decoder comprises:
separation means for separating and extracting said scramble signal, said first information signal packets and said relevant information packets from said broadcasting signal; and
descrambling means for descrambling said scrambled signal using said first information-signal packets and said relevant information packets, said descrambling means descrambling in accordance with said order of multiplexed packets.

5. A broadcasting apparatus comprising a repeating device for receiving a broadcasting signal which is transmitted through a first transmission system, and for sending said broadcasting signal to a second transmission system, wherein said broadcasting signal includes a scrambled signal, a first information signal for descrambling said scrambled signal, and relevant information packets, and wherein said second transmission system includes a contractor decoder, wherein said repeating device comprises:
separation means for separating and extracting said scrambled signal, said first information signal and said relevant information packets from said broadcasting signal;
packeting means for generating first information-signal packets by packeting said first information signal; and
multiplexing means for generating a multiplexing output by multiplexing said first information-signal packets and said relevant information packets upon said scrambled signal, and for outputting said multiplexed output to said second transmission system, said multiplexing means multiplexing said first information-signal packets upon each other, said first information signal packets having preference over said relevant information packets with respect to an order of multiplexed packets within said multiplexed output, and wherein said contractor decoder comprises:
separation means for separating and extracting said scrambled signal, said first information-signal packets and said relevant information packets from said multiplexing output; and
descrambling means for descrambling said scrambled signal using said first information-signal packets and said relevant information packets, said descramblinq means descrambling in accordance with said order of multiplexed packets within said broadcasting signal.

6. A broadcasting apparatus comprising a repeating device for receiving a broadcasting signal which is transmitted through a first transmission system, and for sending said broadcasting signal to a second transmission system, wherein said broadcasting signal includes a scrambled signal, a first information signal for descrambling said scrambled signal, and relevant information packets, and wherein said second transmission system includes a contractor decoder, wherein said repeating device comprises:
separation means for separating and extracting said scrambled signal, said first information signal and said relevant information packets from said broadcasting signal;
packeting means for generating first information-signal packets by packeting said first information signal; and
multiplexing means for generating a multiplexing output by multiplexing said first information-signal packets and said relevant information packets upon said scrambled signal and, when said relevant information packets are not included in said broadcasting signal, by multiplexing said first information-signal packets also to a part corresponding to a multiplexing area of said relevant information packets in said broadcasting signal, and for outputting said multiplexed output to said second transmission system, said multiplexing means multiplexing said first information-signal packets upon each other, said first information signal packets having preference over said relevant information packets with respect to an order of multiplexed packets within said multiplexed output, and wherein said contractor decoder comprises:
separation means for separating and extracting said scrambled signal, said first information signal and said relevant information packets from said multiplexing output; and
descrambling means for descrambling said scrambled signal using said first information-signal packets and said relevant information packets, said descrambling means descrambling in accordance with said order of multiplexed packets within said broadcasting signal.

7. A broadcasting apparatus comprising a repeating device for receiving a broadcasting signal which is transmitted through a first transmission system and for sending said broadcasting signal to a second transmission system, wherein said broadcasting signal includes a scrambled signal, a first information signal for descrambling said scrambled signal, and relevant information packets, and wherein said second transmission system includes a contractor decoder, wherein said repeating device comprises:
separation means for separating and extracting said scrambled signal, said first information signal and said relevant information packets from said broadcasting signal;
packeting means for generating first information-signal packets by packeting said first information signal, said packeting means including memory means for storing a plurality of error correction codes corresponding to signal contents of said first information signal, wherein said error correction codes are read from said memory means and added to said first information signal when said first information signal is packeted; and
multiplexing means for generating a multiplexing output by multiplexing said first information signal packets and said relevant information packets upon said scrambled signal, and for outputting said multiplexing output to said second transmission system, said multiplexing means multiplexing said first information-signal packets upon each other, said first information-signal packets having preference over said relevant information packets with respect to an order of multiplexed packets within said multiplexed output, and wherein said contractor decoder comprises:

separation means for separating and extracting said scrambled signal, said first information signal and said relevant information packets from said multiplexing output;

error correction means for performing error correction of said first information signal packets using said error correction codes; and descrambling means for descrambling said signal using said first information signal packets and said relevant information packets, said descrambling means descrambling in accordance with said order of multiplexed packets within said broadcasting signal.

* * * * *